United States Patent
Mase

(10) Patent No.: US 6,414,482 B1
(45) Date of Patent: Jul. 2, 2002

(54) NON-CONTACT TYPE ROTATIONAL ANGLE SENSOR AND SENSOR CORE USED IN THE SENSOR

(75) Inventor: Makoto Mase, Handa (JP)

(73) Assignee: Aisan Kogyo Kabushiki Kaisha, Obu (JP)

(*) Notice: Subject to any disclaimer, the term of this patent is extended or adjusted under 35 U.S.C. 154(b) by 8 days.

(21) Appl. No.: 09/703,863

(22) Filed: Nov. 2, 2000

(30) Foreign Application Priority Data

Nov. 11, 1999 (JP) .......................................... 11-320785
Apr. 27, 2000 (JP) ....................................... 2000-128051

(51) Int. Cl.[7] .............................. G01B 7/30; G01B 7/14
(52) U.S. Cl. ................................ 324/207.2; 324/207.25
(58) Field of Search ........................ 324/207.13, 207.2, 324/207.21, 207.22, 207.23, 207.24, 207.25; 338/32 R, 32 H; G01B 7/30; G01D 5/40

(56) References Cited

U.S. PATENT DOCUMENTS 5,444,369 A * 8/1995 Luetzow .................. 324/207.2
6,130,535 A * 10/2000 Herden et al. ........... 324/207.2
6,232,771 B1 * 5/2001 Herden et al. .......... 324/207.25

FOREIGN PATENT DOCUMENTS

| DE | 1548591 | * 3/1970 | ............ G01D/5/14 |
| DE | 197 19 019 A 1 | 11/1997 | |
| DE | 197 05 835 A 1 | 8/1998 | |
| DE | 197 26 691 A 1 | 1/1999 | |
| FR | 2670286 | * 12/1990 | ............ G01D/5/20 |
| JP | 8-35809 | 2/1996 | |
| JP | 2842482 | 10/1998 | |

* cited by examiner

Primary Examiner—Edward Lefkowitz
Assistant Examiner—Darrell Kinder
(74) Attorney, Agent, or Firm—Oliff & Berridge PLC

(57) ABSTRACT

A sensor core used in a non-contact type rotational angle sensor is constructed of an outer core made of a magnetic material, an inner core made of a magnetic material in a disc shape disposed coaxially with and inside the outer core, a first air gap produced between an inner peripheral surface of the outer core and an outer peripheral plane of the inner core, a second air gap produced extending in a radial direction of the outer core to the first air gap, and a plate-like magnet magnetized in its thickness direction and mounted in a mounting gap of the inner core. The inner peripheral surface of the outer core is provided with stepped portions so that the first air gap stepwise increases in dimension with approach toward the second air gap.

6 Claims, 19 Drawing Sheets

NON-CONTACT TYPE ROTATIONAL ANGLE SENSOR AND SENSOR CORE USED IN THE SENSOR

BACKGROUND OF THE INVENTION

1. Field of the Invention

The present invention relates to a rotational angle sensor to be used for detecting a rotational angle of an object, and more particularly to a non-contact type rotational angle sensor for detecting a rotational angle of an object in non-contact therewith by converting the rotational angle to a change in magnetic force, and a sensor core used in the non-contact type rotational angle sensor.

2. Description of Related Art

Conventionally, there have been known contact type rotational angle sensors using a potentiometer. This potentiometer is constructed such that a wiper slides on a resistance element, thereby changing electrical resistance values. Accordingly, dust particles resulting from friction between the resistance element and the wiper may be generated in a sliding portion therebetween. The dust particles would cause detection errors in the resistance values. Furthermore, a frictional resistance in the sliding portion may become an operating resistance to an object to be detected, which affects the operating responsivity of the object.

As a rotational angle sensor to resolve the above disadvantages of the contact type rotational angle sensor, a non-contact type with no sliding member or portion has been developed. One of such the non-contact type rotational angle sensors is constructed to detect a rotational angle of an object in non-contact therewith by converting the rotational angle to a change in magnetic force. Japanese patent No. 2,842,482 and Japanese patent unexamined publication No. 8-35809 disclose an example of the non-contact type rotational angle sensor of this kind.

FIG. 25 shows main parts of the rotational angle sensor disclosed in Japanese patent No. 2,842,482. This rotational angle sensor is provided with a cylindrical case 51 and a connecting shaft 52 disposed rotatably in the center of the case 51. A first member 53 is fixed on the inner peripheral surface of the case 51. The first member 53 is constituted of two semicircular rings 53A and 53B, both made of a soft magnetic material. Between the semicircular rings 53A and 53B there are provided two sub-air-gaps 54. An electric coil 56 is arranged in one gap 54, and a Hall probe is arranged in the other gap 54. A second member 57 made of a soft magnetic material is fixed on the connecting shaft 52. A tubular magnet 58 constructed of two thin members 58A and 58B is fit on the outer periphery of the second member 57. The tubular magnet 58 is made of mold samarium-cobalt formed and magnetized in a tubular shape. A main-air-gap 59 is disposed between the tubular magnet 58 and the first member 53. The main-air-gap 59 is desired to be as narrow as possible. In the above publication, if the average inner diameter of the second member 57 is 5 mm and the thickness of the tubular magnet 58 is 1 mm, then the width of the main-air-gap 59 is of the order of 0.2 mm. Thus, a magnetic field is generated between the first member 53 and the tubular magnet 58 and the second member 57. When the second member 57 and the tubular magnet 58 are rotated together with the connecting shaft 52, the magnetic field is rotated, thereby changing the density of magnetic flux passing through the Hall probe 56 and the electric coil 55. The change in the magnetic flux density is output in the form of electric signals.

FIG. 26 shows main parts of the rotational angle sensor disclosed in Japanese patent unexamined publication No.8-35809. This rotational angle sensor is provided with a tubular yoke 61 and a driven shaft 62 disposed in the center of the yoke 61, both being integrally configured. A tubular permanent magnet 63 is fixedly provided on the inner peripheral surface of the tubular yoke 61 made of a soft magnetic material. The tubular magnet 63 has been magnetized in a radial direction in cross-section. Around the driven shaft 62, two separated tubular stators 64A and 64B are fixedly disposed. The driven shaft 62 is allowed to rotate in a central area surrounded by the stators 64A and 64B. A Hall element 66 is provided in a gap 65 between the two stators 64A and 64B. The tubular yoke 61 and the tubular magnet 63 are arranged rotatably with respect to the stators 64A and 64B. An annular air-gap 67 is produced between the tubular magnet 63 and the stators 64A and 64B. Thus, a magnetic field is generated between the tubular yoke 61, the tubular magnet 63, and the stators 64A and 64B. Accordingly, rotation of the tubular magnet 63 together with the tubular yoke 61 causes rotation of the magnetic field, thereby changing the density of magnetic flux passing through the Hall element 66. The change in the magnetic field density is output in the form of electrical signals.

In the rotational angle sensor of Japanese patent No. 2,842,482, however, the tubular magnet 58 is made of mold samarium-cobalt formed and magnetized in a tubular shape with a very small thickness of about 1 mm, which would be very physically brittle and hard to manufacture. In addition, the tubular magnet 58 after fit on the outer periphery of the second member 57 has to be assembled with the shaft 52 while keeping the extreme narrow main-air-gap 59 with respect to the first member 53. Therefore, in assembling, even a slight inclination of the tubular magnet 58 or the first member 53 may bring them into contact, which would easily damage the tubular magnet 58. This results in difficulty in manufacturing the rotational angle sensor and deterioration in the accuracy of detection of a rotational angle.

In the rotational angle sensor of Japanese patent unexamined publication No. 8-35809, on the other hand, there is a problem that it is difficult to manufacture the tubular magnet 63. In addition, the tubular magnet 63 has to be fixed on the inner peripheral surface of the tubular yoke 61 and, inside of the magnet 63, the stators 64A and 64B are needed assembling with the air-gap 67 of a predetermined dimension. During assembly, contact between the tubular magnet 63 and the stators 64A and 64B would cause damage to them. This makes it difficult to manufacture the rotational angle sensor and also causes deterioration in the accuracy of detection of a rotational angle.

SUMMARY OF THE INVENTION

The present invention has been made in view of the above circumstances and has an object to overcome the above problems and to provide a non-contact type rotational angle sensor capable of providing enhanced productivity of magnets, sensor cores with the magnets, and rotational angle sensors, and improved assembling property of parts and elements to enhance the accuracy of detection of a rotational angle, and a sensor core used in the sensor.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a sensor core used in a non-contact type rotational angle sensor for detecting a rotational angle of an object in non-contact therewith by converting the rotational angle to a change in magnetic force, the sensor core including: a stator core provided with two blocks made of a magnetic material; a mover core provided with two blocks made of a magnetic material, disposed coaxially with the stator core; a first gap produced between the stator core and the mover core; a second gap produced between the two stator blocks; a third gap produced between the two mover blocks; and a rectangular parallelepiped magnet disposed in the third gap and magnetized in a direction across the third gap to connect the mover blocks.

In the above sensor core, preferably, a shape of one of the stator core and the mover core is determined to produce the first gap with a dimension changing to become largest in a vicinity of a center line of the second gap.

Alternatively, both shapes of the stator core and the mover core are determined to produce the first gap with the dimension changing to become largest in the vicinity of the center line of the second gap.

Preferably, the shape of one of the stator core and the mover core is determined so that the dimension of the first gap changes stepwise.

In the above sensor core, preferably, the shape of one of the mover core and the stator core is determined to include a taper surface or an elliptic surface so that the dimension of the first gap changes continuously.

According to another aspect of the present invention, there is provided a non-contact type rotational angle sensor using the sensor core including a rotor constructed of the magnet mounted in the third gap of the mover blocks, the sensor including: a base for fixing the stator core; and magnetic force detecting means disposed in the second gap, for detecting a change in magnetic force in response to rotation of the rotor; the rotor being to be connected with the object.

In the above non-contact type rotational angle sensor, preferably, both shapes of the stator core and the mover core are determined to produce the first gap with the dimension changing to become largest in the vicinity of the center line of the second gap.

Preferably, the shape of one of the stator core and the mover core is determined so that the dimension of the first gap changes stepwise.

In the above non-contact type rotational angle sensor, preferably, the shape of one of the mover core and the stator core is determined to include a taper surface or an elliptic surface so that the dimension of the first gap changes continuously.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of preferred embodiments of a non-contact type rotational angle sensor embodying the present invention will now be given referring to the accompanying drawings.

First Embodiment

A first embodiment of the non-contact type rotational angel sensor is described below with reference to FIGS. 1–7.

Figure 1:
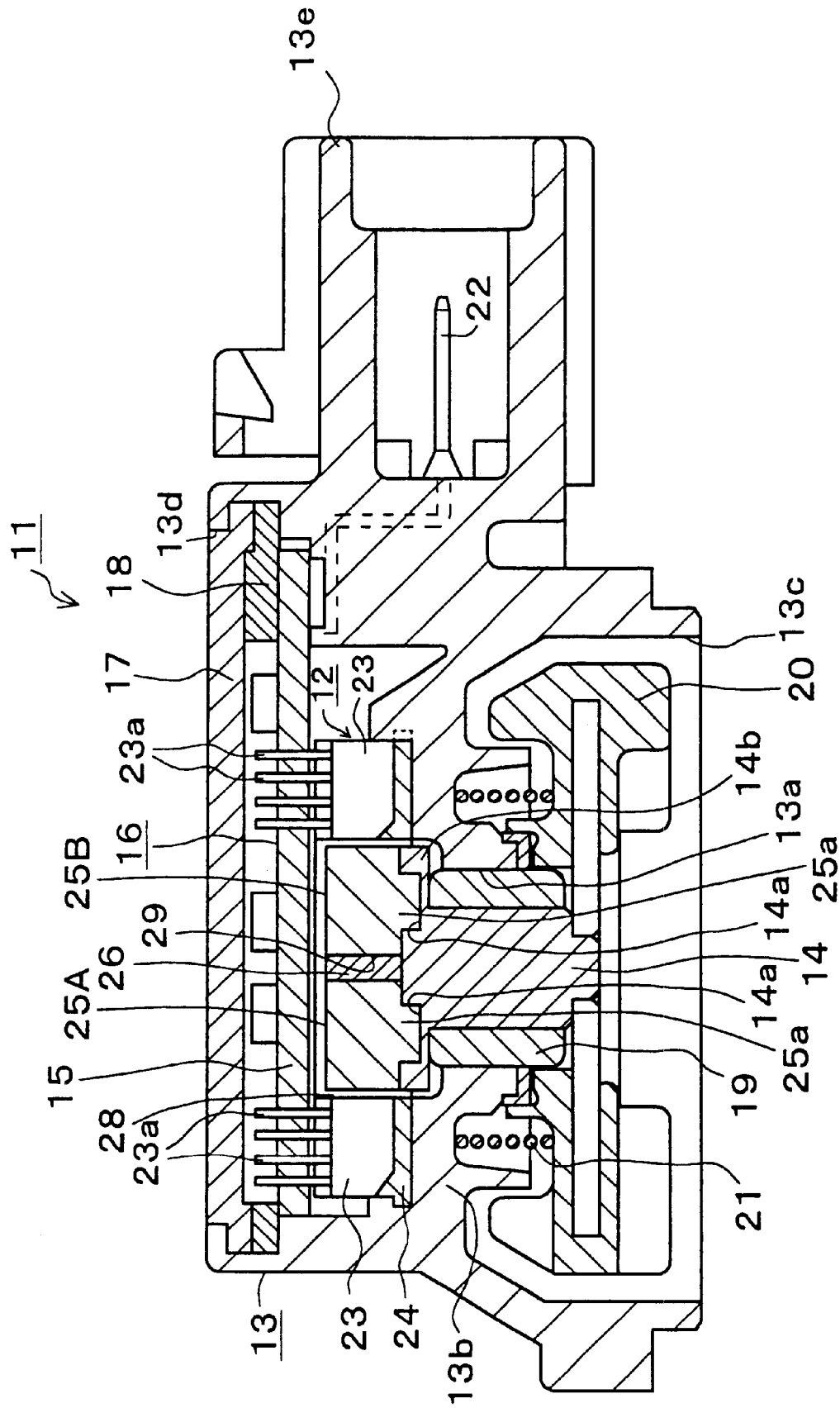
FIG. 1 is a sectional view of a non-contact type rotational angle sensor in a first embodiment according to the present invention.

FIG. 1 is a sectional view of the non-contact type rotational angle sensor 11 in the first embodiment. In automotive engines, for example, this rotational angle sensor 11 is used as a throttle sensor for detecting an opening degree of an object, namely, a throttle valve, or an accelerator sensor for detecting an operating amount of another object, namely, an accelerator pedal. The rotational angle sensor 11 includes a sensor core 12 for detecting a rotational angle of the object in non-contact therewith by converting the rotational angle to a change in magnetic force.

The rotational angle sensor 11 is provided with a housing 13 made of a nonmagnetic material, such as resin, an input shaft 14 made of a nonmagnetic material, such as resin, disposed rotatably in the housing 13, the non-contact type sensor core 12, an electrical circuit section 16 including a substrate 15.

The housing 13 is constructed of a support wall 13b formed with a hole 13a for holding the input shaft 14, an opening 13c for the input shaft 14, an opening 13d for the electrical circuit section 16, and a connector 13e used for connection of electrical wiring. In the opening 13d, there are disposed a cover 17 for covering the electrical circuit section 16 and a packing 18 for providing a seal between the cover 17 and the electrical circuit section 16. A bearing 19 is fixed in the hole 13a of the support wall 13b to rotatably support the input shaft 14. An end (a lower end in FIG. 1) of the input shaft 14 is fixed to a lever 20 to be used for connection with the object to be detected. This lever 20 is mechanically connected with a lever of the object through the opening 13c. A spring 21 is provided between the support wall 13b and the lever 20, whereby to generate a rotational torque and a thrust load. The connector 13e is internally provided with a terminal 22 connected with the substrate 15.

Figure 2:
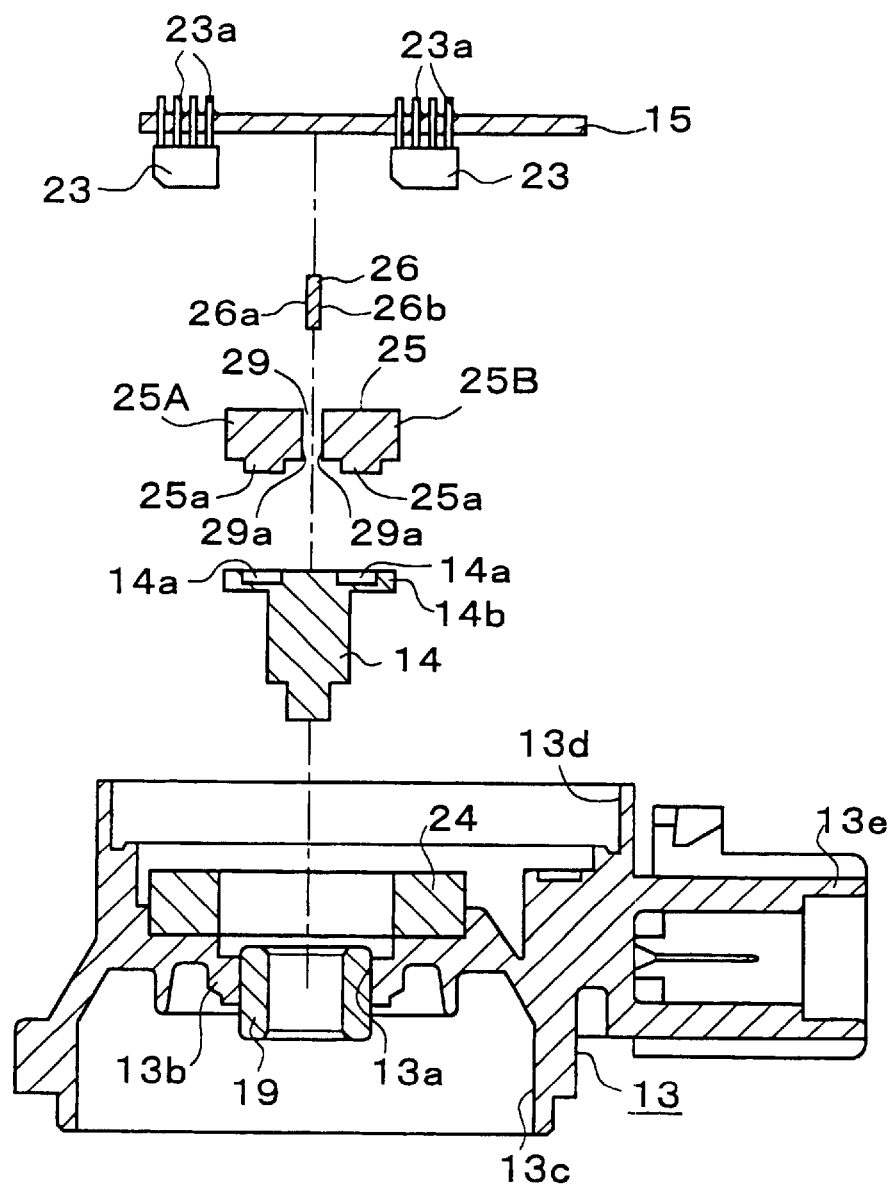
FIG. 2 is an exploded sectional view of a sensor core and others in the first embodiment.
Figure 3:
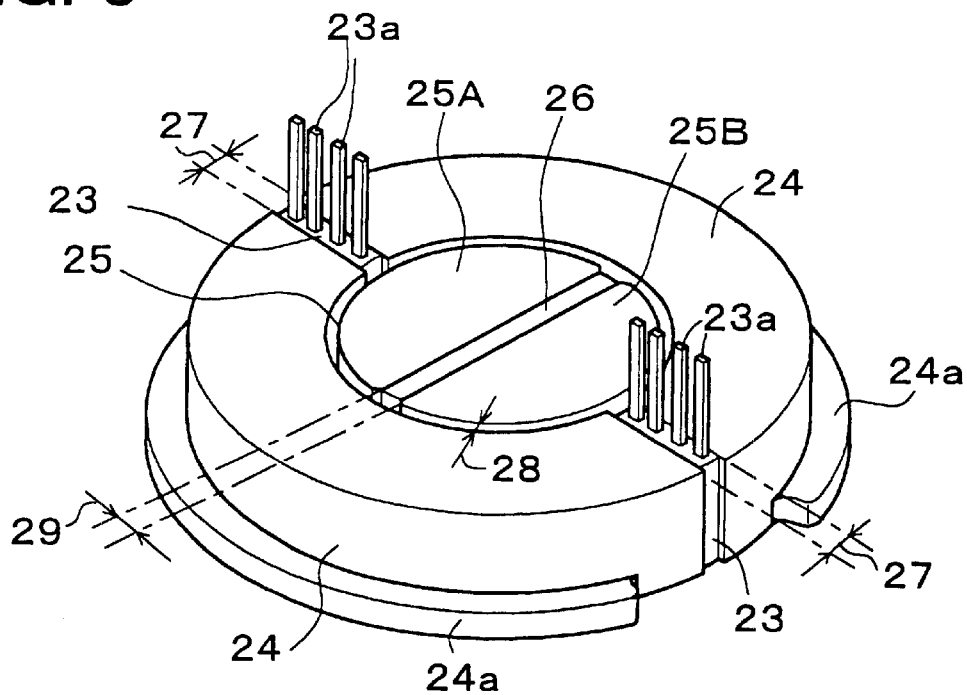
FIG. 3 is a perspective view of an assembly of the sensor core and a Hall IC in the first embodiment.
Figure 4:
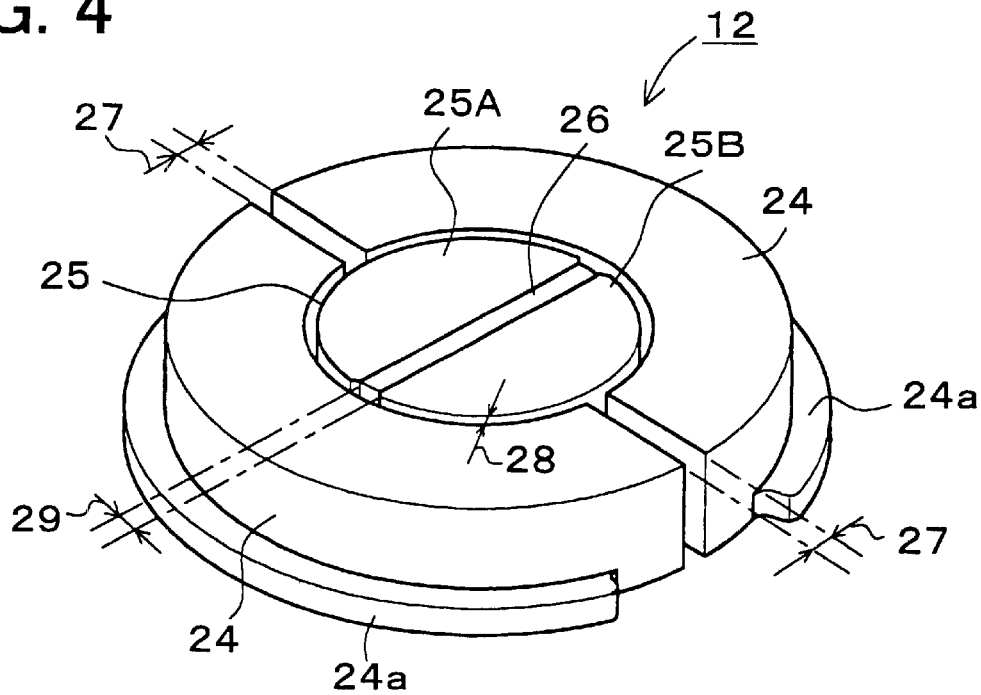
FIG. 4 is a perspective view of the sensor core in the first embodiment.
Figure 5:
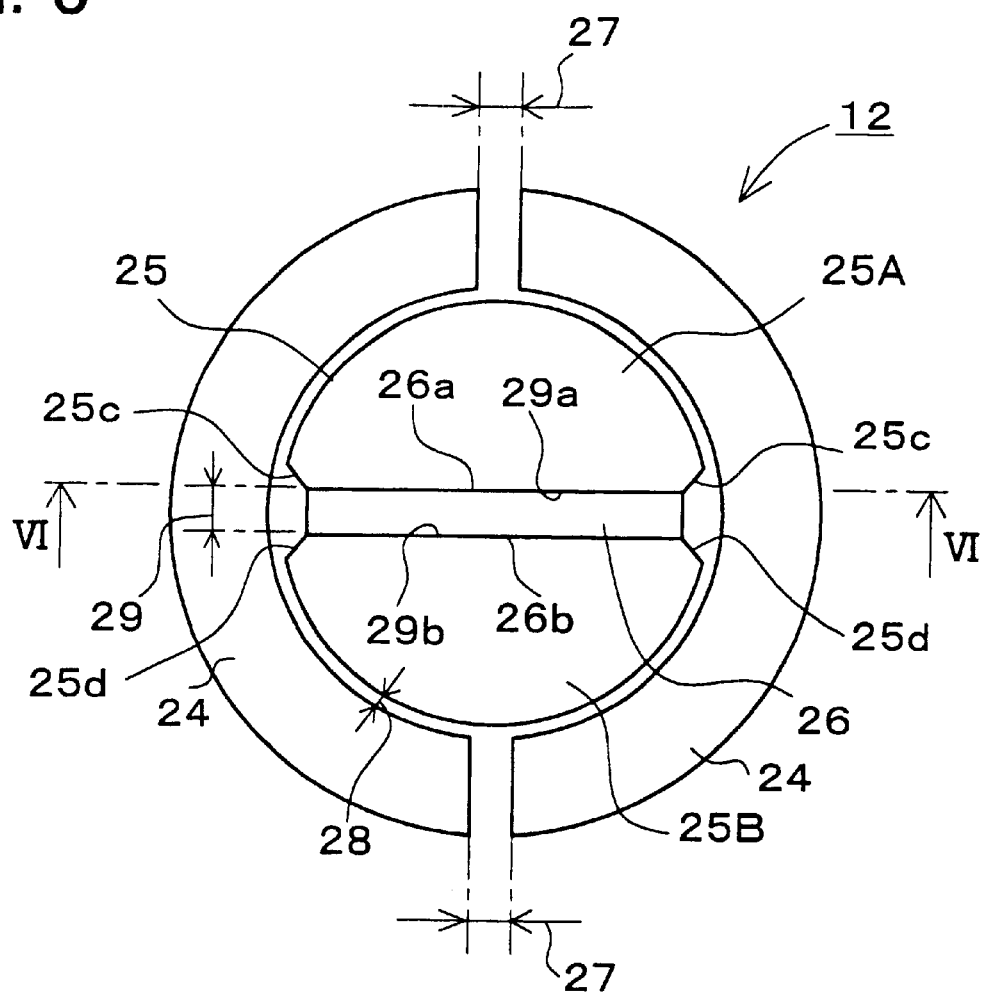
FIG. 5 is a plan view of the sensor core in the first embodiment.
Figure 6:
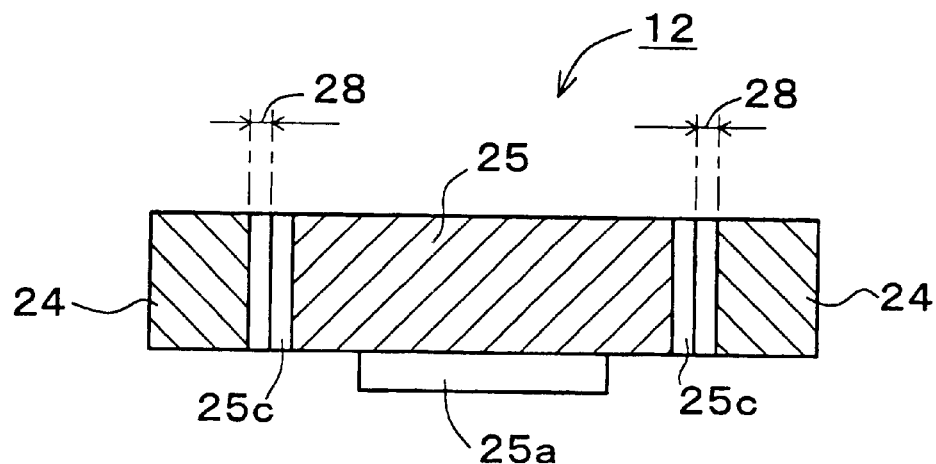
FIG. 6 is a sectional view taken along the line VI—VI in FIG. 5.
Figure 7:
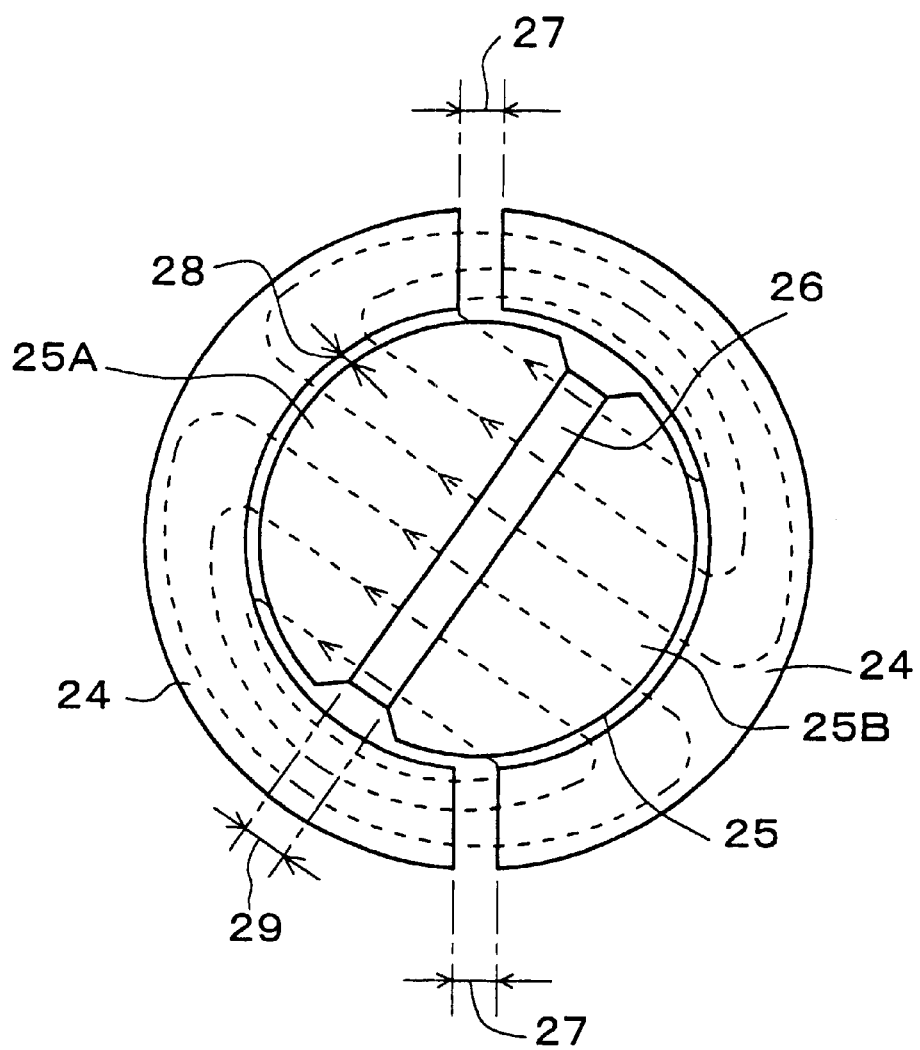
FIG. 7 is a plan view of the sensor core in the first embodiment, showing a magnetic field generated therein.

FIG. 2 is an exploded sectional view of the sensor core 12 and others. FIG. 3 is a perspective view of an assembly of the sensor core 12 and a Hall IC 23. FIG. 4 is a perspective view of the sensor core 12 only. FIG. 5 is a plan view of the sensor core 12. FIG. 6 is a sectional view taken along the line VI—VI in FIG. 5. FIG. 7 is a plan view of the sensor core 12, showing a magnetic field generated therein.

The sensor core 12 is constructed of an outer core 24 which is a stator, an inner core 25 which is a mover, and a plate-shaped magnet 26. The outer core 24 is made of a soft magnetic material in a ring shape in a plan view. In the present embodiment, a pure ion sintered material is used as the soft magnetic material. Instead thereof, silicon steel, iron-nickel alloy, iron-cobalt alloy, etc. may be used. The outer core 24 is formed with a pair of second air-gaps 27 extending in a radial direction. The air-gaps 27 are arranged at two positions which are in a symmetric relation of a 180 deg. rotation in the outer core 24. In each of those air-gaps 27, the Hall IC 23 serving as magnetic force detecting means of the present invention is disposed. The Hall IC 23, as well known, includes a Hall element utilizing a Hall effect and measures a voltage under a constant current to detect a magnetic field including the magnitude of magnetic force. As shown in FIGS. 3 and 4, the outer core 24 is formed with a circumferential protrusions 24a (which are not illustrated in FIGS. 5–7 for convenience shake). The Hall IC 23 is fixed and electrically connected to the substrate 15 with a plurality of pins 23a arranged in one side of the IC 23. The Hall ICs 23 fixed to the substrate 15 are inserted in the corresponding second air-gaps 27. In the present embodiment, the outer core 24 is insert-molded to the support wall 13b of the housing 13. The protrusions 24a serve as a stopper to prevent detachment or rotation of the outer core 24 during insert-molding.

The inner core 25 is coaxially placed in the inside of the outer core 24. The inner core 25 is constituted of two core pieces 25A and 25B, both made of a soft magnetic material in the shape of a semi-disc, both configuring a disc. The materials recited above for the outer core 24 may be used as that for the core pieces 25A and 25B. A gap 29 is provided between the two core pieces 25A and 25B to mount therein the plate magnet 26. This mounting gap 29 extends along the diametrical direction of the inner core 25 and is defined by a pair of inner wall faces 29a and 29b facing each other with a predetermined distance (corresponding to the width of the gap 29). Both ends 25c and 25d of the core pieces 25A and 25B form taper faces with an inclination to the lengthwise direction of the mounting gap 29.

An annular first air-gap 28 is provided between the outer core 24 and the inner core 25. The outer core 24 is fixed on the support wall 13b. The inner core 25 is disposed on a base end part (an upper end part in FIGS. 1 and 2) of the input shaft 14. The inner core 25 is thus integrally rotatable with the input shaft 14. As shown in FIGS. 1 and 2, the input shaft 14 is provided with a flange 14b formed with a pair of recesses 14a at the base end part. Each of the core pieces 25A and 25B of the inner core 25 is provided with a protrusion 25a engageable in the recess 14a. With the protrusion 25a inserted in the corresponding recess 14a, the inner core 25 is fixedly held on the flange 14b.

The plate magnet 26 is of a rectangular parallelepiped plate shape having a length slightly shorter than the diameter of the inner core 25 and is magnetized in its thickness direction. The plate magnet 26 has plate faces 26a and 26b joined to the two inner wall faces 29a and 29b forming the gap 29. The thickness of the plate magnet 26 is determined to be almost equal to the width of the gap 29. In the present embodiment, the plate magnet 26 is made of a material such as 1–5 system samarium-cobalt, ferrite, or neodymium, etc. As shown in FIGS. 1, 3 to 5, the plate magnet 26 is inserted in the gap 29, or sandwiched between the core pieces 25A and 25B. To be more specific, the plate magnet 26 is mounted in the gap 29 so that the both faces 26a and 26b of the plate magnet 26 are joined to the inner wall faces 29a and 29b. In mounting, it is conceivable to use an adhesive to fix the plate magnet 26 to the inner wall faces 29a and 29b of the inner core 25. However, the fixing with the adhesive may result in crack and peeling of the adhesive, thereby causing the inner core 25 and the magnet 26 to drop off. For this reason, in the present embodiment, the plate magnet 26 is insert-molded to the flange 14b of the input shaft 14 and thus fixed in the inner core 25.

Next, a process for assembling the sensor cores 12 and others is explained with reference to FIG. 2.

The Hall IC 23 is packed in advance on the substrate 15. The bearing 19 is also fixed in advance in the hole 13a of the support wall 13b of the housing 13.

The outer core 24 is insert-molded in advance to the support wall 13b of the housing 13. Instead of the insert-molding, a fixing manner by press-fitting or heat-caulking may be adopted.

The plate magnet 26 is insert-molded in advance to the flange 14b of the input shaft 14. The core pieces 25A and 25B constituting the inner core 25 are press-fit in the recesses 14a of the input shaft 14, sandwiching the plate magnet 26 therebetween. Instead of the press-fitting, the inner core 25 may be insert-molded to the flange 14b of the input shaft 14 as is the case with the plate magnet 26.

The assembly of the input shaft 14, the inner core 25, and the plate magnet 26 is mounted in the outer core 24 and the bearing 19 both fixed in advance to the housing 13.

After that, the substrate 15 mounting the Hall ICs 23 is mounted in the housing 13. At this time, the Hall ICs 23 are inserted in the second air-gaps 27 in the outer core 24 respectively.

In the above way, the sensor core 12 and others are mounted in the housing 13.

In the rotational angle sensor 11 in the first embodiment, constructed as above, a magnetic field is generated among the inner core 25, the plate magnet 26, and the outer core 24, a combination of which constitutes the sensor core 12, as shown by dashed lines in FIG. 7.

When the input shaft 14 connected to the object through the lever 20 is rotated with rotation of the object, the inner core 25 and the plate magnet 26 are rotated at the same time, thereby rotating the magnetic field shown by the dashed lines-in FIG. 7. At this time, the density of magnetic flux passing through the Hall ICs 23 at the two second air-gaps 27 in the outer core 24 fixed to the housing 13 changes. The change in the magnetic flux density is detected as the rotational angle of the object. The Hall IC 23 converts the change in the magnetic flux density to a voltage change and outputs it. The rotational angle sensor 11 in the first embodiment can detect the rotational angle of the object in a detection range of about 90 deg. and provide linear output characteristics in the range.

According to the rotational angle sensor 11 using the sensor core 12 in the first embodiment, there is no need for forming the magnet 26 into a tubular shape; therefore, the plate magnet 26 is easier to manufacture than the prior art tubular magnets. In addition, the plate magnet 26 requires a lesser amount of materials for manufacture than the tubular magnets. The prior art tubular magnets need to have an inner or outer peripheral surface of a perfect circle in section so as to come into close contact with an outer or inner peripheral surface of the corresponding members. This requires high accuracy processing. The plate magnet 26 in the present embodiment is, however, made of a plate-shaped material, needing no bending processing. Such a difference in shape makes it possible to produce the plate magnet 26 more easily and at low cost. Accordingly, the sensor core 12 and the rotational angle sensor 11 can be manufactured easily and at low cost. The productivity of the plate magnet 26, the sensor core 12 and the rotational angle sensor 11 including the magnet 26 can be thus enhanced.

In the first embodiment, the plate magnet 26 is mounted in the gap 29 so that the plate faces 26a and 26b are joined to the inner wall faces 29a and 29b respectively. Differing from the case where the tubular magnets are assembled with the corresponding members over their inner or outer peripheral surfaces in the prior art, the plate magnet 26 needs no high accurate assembling position and clearance, thus causing no problem of variations in clearance.

Accordingly, the assembling property of the sensor core 12 and the rotational angle sensor 11 can be improved. Since no problem of variations in clearance will occur, the magnetic resistance is constant, which allows an enhancement of the detection accuracy of a rotational angle by the rotational angle sensor 11.

In the rotational angle sensor 11 in the first embodiment, two Hall ICs 23 in all are arranged in the two second air-gaps 27 positioned in a rotational symmetry in the outer core 24. This makes it possible to detect the magnetic flux density by using one of the Hall ICs 23 even if the other breaks down. Thus, the rotational angle sensor 11 can include a fail-safe function, so that its reliability can be increased.

In the first embodiment, the non-contact type rotational angle sensor 11 is provided with no sliding portion in the sensor core 12; accordingly, there occur no detection errors resulting from the dust particles generated by friction in the sliding portion of the contact type rotational angle sensor in the prior art. For this reason, the sensor 11 of the present invention can maintain the sensor reliability for a long period. In addition, differently from the contact type rotation sensor in the prior art, the non-contact type sensor 11 has no disadvantage that the frictional resistance in the sliding portions becomes an operating resistance to the object to be detected. If the sensor 11 is used as a throttle sensor, accordingly, it will not decrease the operating responsivity of a throttle valve which is the object to be detected.

In the first embodiment mentioned above, the following alternatives may be adopted:

1) Although the two second air-gaps 27 are provided in the sensor core 12 and the Hall ICs 23 are disposed in the gaps 27 respectively, one or three or more second air-gaps may be provided in the sensor core so that the Hall ICs are arranged in respective gaps;

2) The Hall IC 23 is used as magnetic force detecting means in the above embodiment, but any alternative detecting elements may be used; and 3) In the first embodiment, a pair of core pieces 25A and 25B constitute the disc-shaped inner core 25 with the mounting gap 29 produced between the core pieces 25A and 25B.

Alternatively, the disc-shaped inner core may be formed in a single body with a linear recess extending in a diametrical direction of the core so that the recess is used as a mounting gap.

Second Embodiment

The second embodiment of a non-contact type rotational angle sensor of the present invention and its sensor core will be described below with reference to the accompanying drawings.

Figure 12:
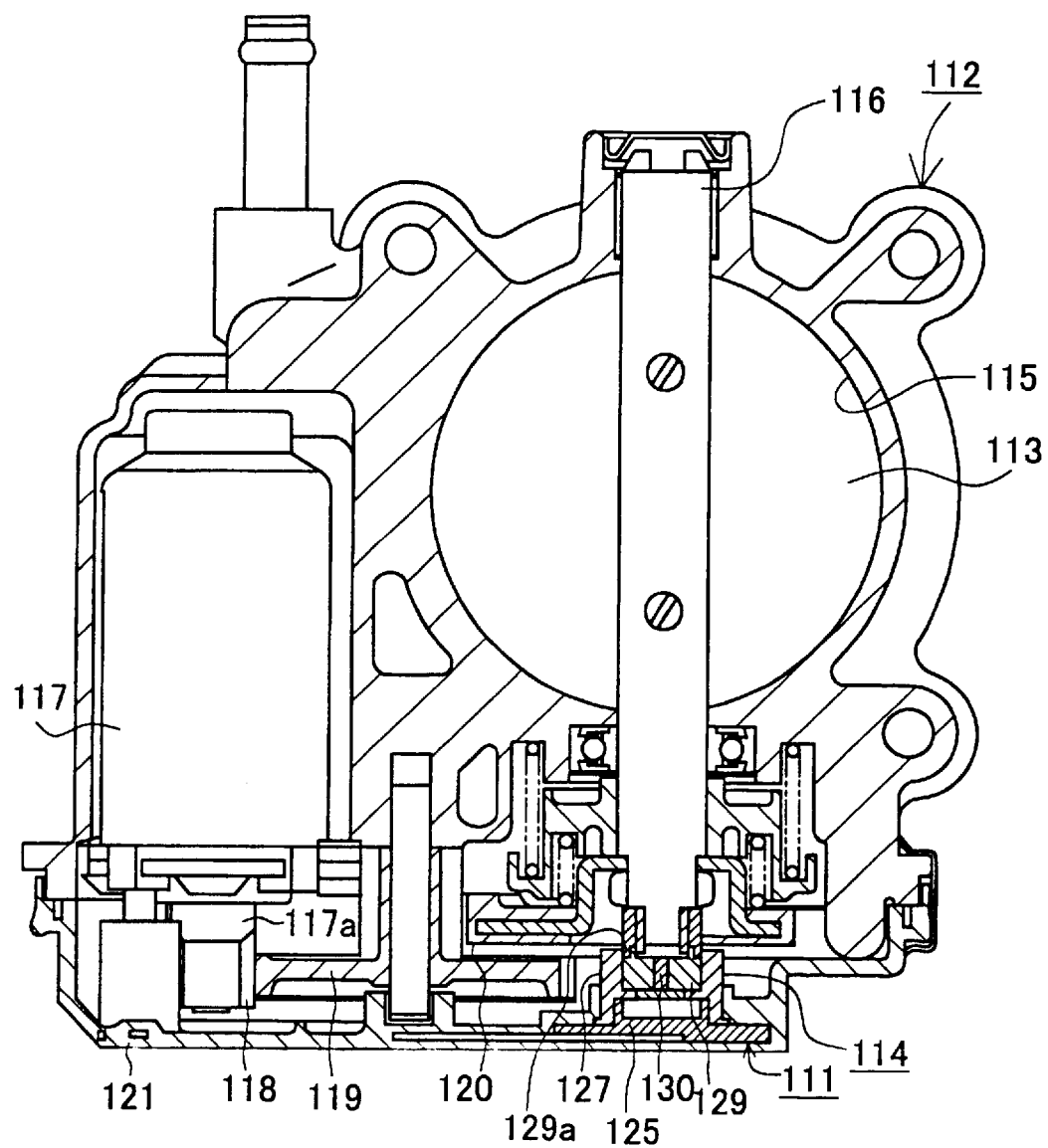
FIG. 12 is a sectional view of a throttle body in the second embodiment.

FIG. 12 is a sectional view showing a structure of a throttle body 112 to which a non-contact type rotational angle sensor 111 in the second embodiment is applied. The rotational angle sensor 111 is used as a throttle sensor for detecting an opening (throttle angle) of a throttle valve 113 which is an object to be detected in an automotive engine. Furthermore, the rotational angle sensor 111 includes a sensor core 114 for detecting a rotational angle of the throttle valve 113 in non-contact therewith by converting the rotational angle to a change in magnetic force.

The throttle valve 113 is supported in an intake passage 115 formed in the throttle body 112 so as to be rotatable around a throttle shaft 116. An output shaft 117a of the motor 117 provided in the throttle body 112 is connected to the throttle shaft 116, and is driven via a drive gear 118, a counter gear 119 and a throttle gear 120. The rotational angle sensor 111 is mounted on a cover 121 attached to the throttle body 112. This cover 121 is made of a nonmagnetic material (e.g., resin).

Figure 13:
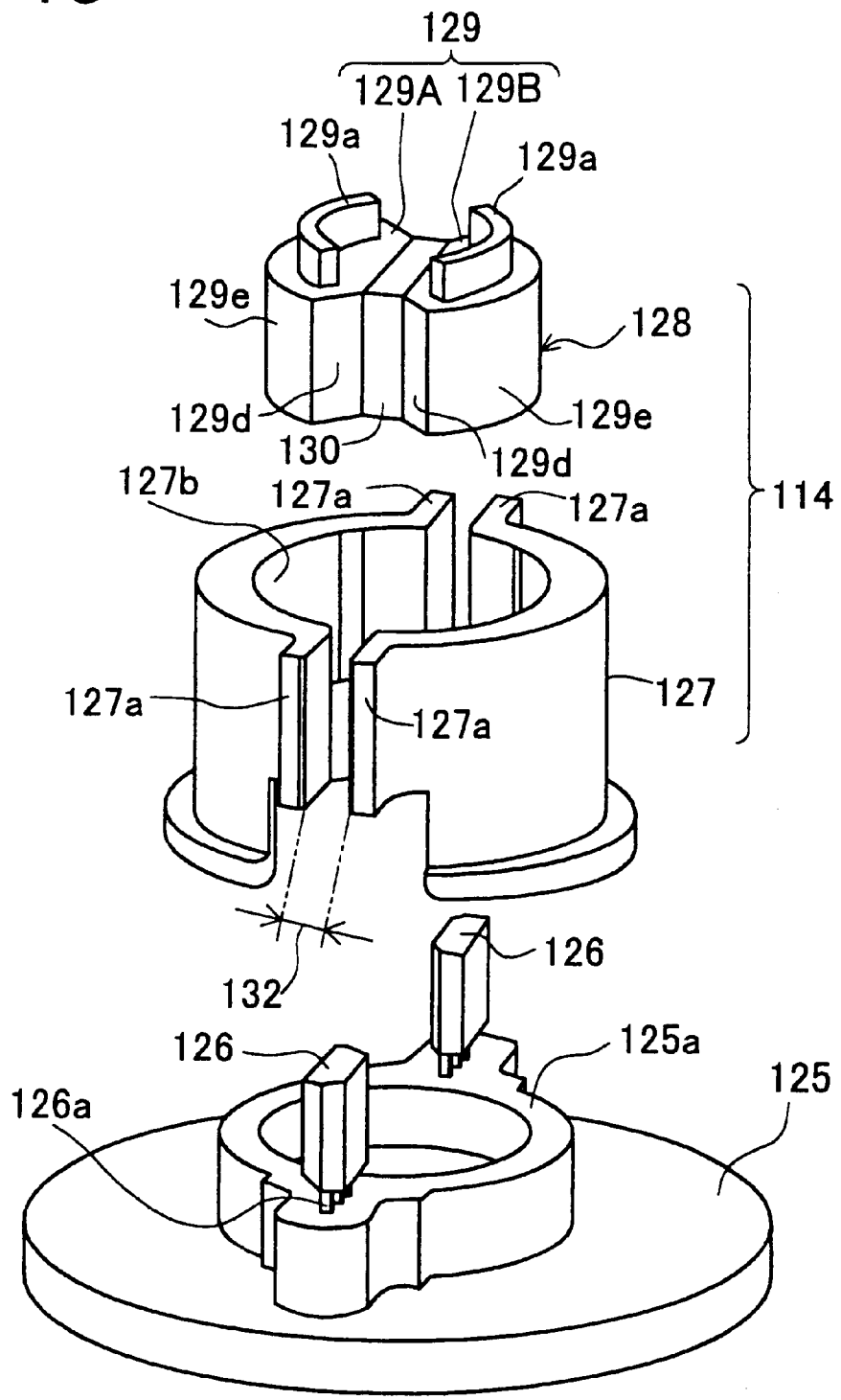
FIG. 13 is an exploded perspective view of a rotational angle sensor in the second embodiment.

FIG. 13 is an exploded perspective view showing the rotational angle sensor 111. As shown in FIG. 12 and FIG. 13, the rotational angle sensor 111 includes a substrate 125 used as a base fixed to the cover 121, a pair of Hall ICs 126 which is fixed onto the substrate 125 and functions as magnetic force detecting means, and a sensor core 114 which is fixed on the substrate 125. The substrate 125 is formed with a substantially ring-shaped protruding portion 125a. Each of the Hall ICs 126 is fixed to the protruding portion 125a by pins 126a so as to be electrically connected to the substrate 125. The sensor core 114 includes an outer core 127 which is a stator formed into a substantially cylindrical shape, and a rotor 128 which is assembled in the inside of the outer core 127. The outer core 127 is fixedly fitted on the protruding portion 125a. The rotor 128 includes an inner core 129 which is a mover integrally assembled like a cylinder, and a plate-shaped magnet 130. The inner core 129 includes a pair of core pieces 129A and 129B formed into a substantially semi-disc shape. The plate magnet 130 is fixed between both core pieces 129A and 129B. As shown in FIG. 13, each of the core pieces 129A and 129B is formed with an arc-shaped protruding portion 129a at it supper surface. As shown in FIG. 12, these protruding portions 129a make a pair so as to be fixed to one end portion of the throttle shaft 116, and thereby, the sensor core 114 is coupled to the throttle shaft 116.

Figure 8:
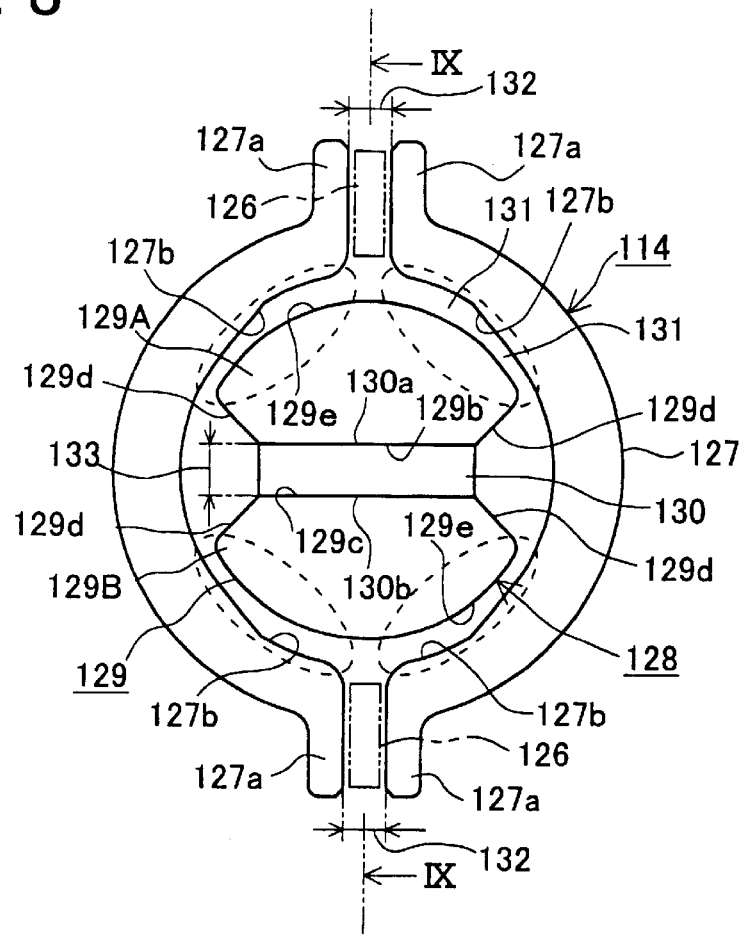
FIG. 8 is a plan view of a sensor core in a second embodiment.
Figure 9:
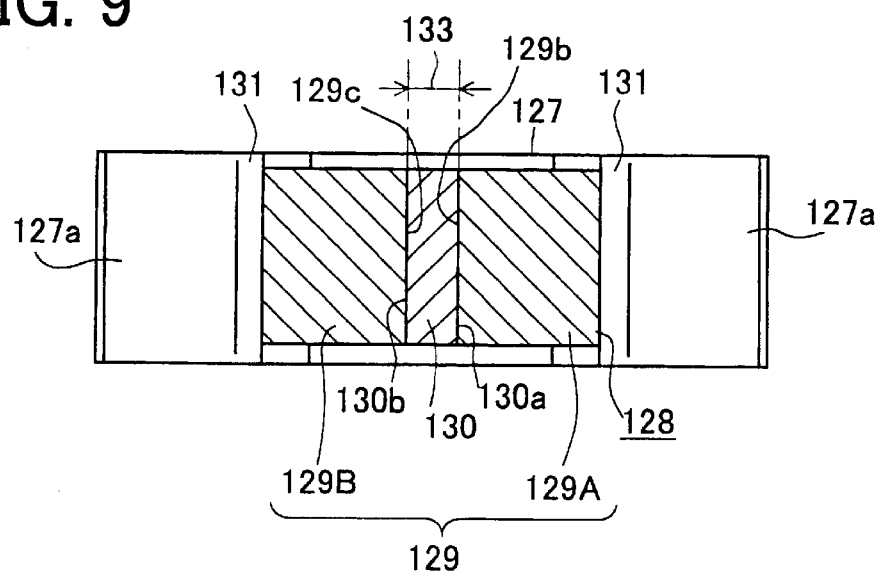
FIG. 9 is a sectional view taken along the line IX—IX in FIG. 8.

FIG. 8 is a plan view of the sensor core 114, and FIG. 9 is a sectional view taken along the line IX—IX of FIG. 8. In the inner core 129 shown in FIGS. 8 and 9, the protruding portions 129a are not illustrated. As described above, the sensor core 114 includes the outer core 127 and the rotor 128 constructed of the inner core 129 and the plate magnet 130. An annular first air gap 131 is produced between an inner peripheral surface of the outer core 127 and an outer peripheral surface of the inner core 129.

The outer core 127 is made of a soft magnetic material in a substantially ring shape in a plan view. In this second embodiment, a pure iron sintered material is used as the soft magnetic material. Alternatively, silicon steel, iron-nickel alloy, iron-cobalt alloy, or the like may be used. The outer core 127 includes a pair of second air gaps 132 extending in a diametrical direction of the core 127. These air gaps 132 are arranged at two positions which are in a symmetric relation of a 180 deg. rotation in the outer core 127, and communicate with the first air gap 131. The outer core 127 includes a pair of ribs 127a facing each other at each position of the second air gaps 132. Each of these second air gaps 132 is provided with the Hall IC 126. As already known, the Hall IC 126 includes a Hall element using a Hall effect and measures a voltage under a constant current to detect a magnetic field including the magnitude of magnetic force.

The inner core 129 is coaxially arranged in the inside of the outer core 127. Furthermore, the inner core 129 is formed into a disc shape, constructed of two semi-disc core pieces 129A and 129B both made of a soft magnetic material. The materials recited for the outer core 127 may be used as the soft magnetic material for the core pieces 129A and 129B. A mounting gap 133 for mounting the plate magnet 130 is formed between the two core pieces 129A and 129B. The mounting gap 133 extends along the diametrical direction of the inner core 129, and is defined by a pair of inner wall faces 129b and 129c facing each other with a predetermined distance.

The plate magnet 130 is of a rectangular parallelepiped plate shape having a length shorter than the diameter of the inner core 129 and is magnetized in its thickness direction. Furthermore, the plate magnet 130 has plate faces 130a and 130b joined to the two inner wall faces 129b and 129c forming the mounting gap 133, respectively. The thickness of the plate magnet 130 is set to be almost equal to the width of the mounting gap 133. In the second embodiment, the plate magnet 130 is made of a material such as samarium cobalt, ferrite, or neodymium, etc. As shown in FIGS. 8 and 9, the plate magnet 130 is held between the core pieces 129A and 129B in the mounting gap 133, thereby constructing the rotor 128.

Figure 10:
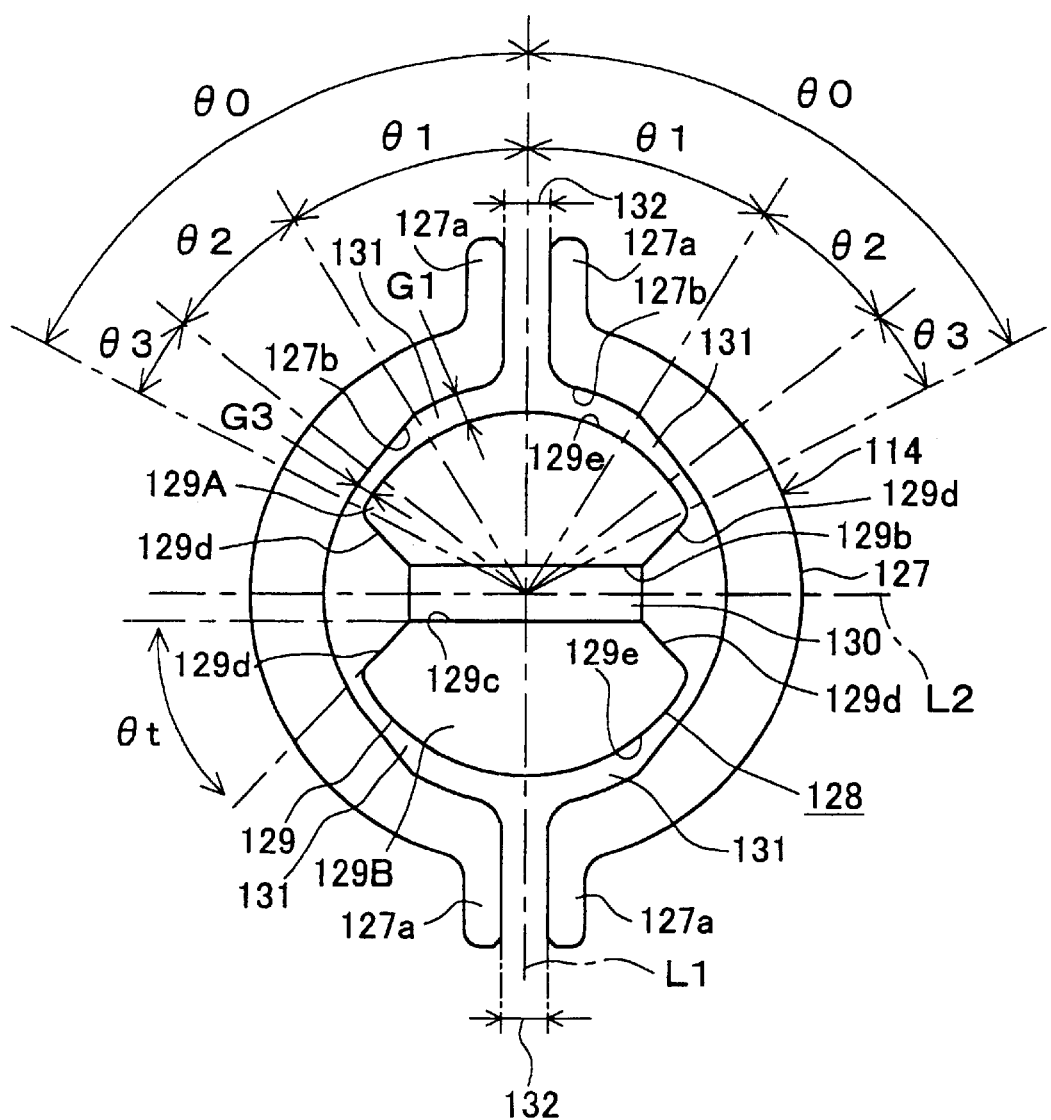
FIG. 10 is a plan view of the sensor core in the second embodiment, showing its constructive feature.
Figure 11:
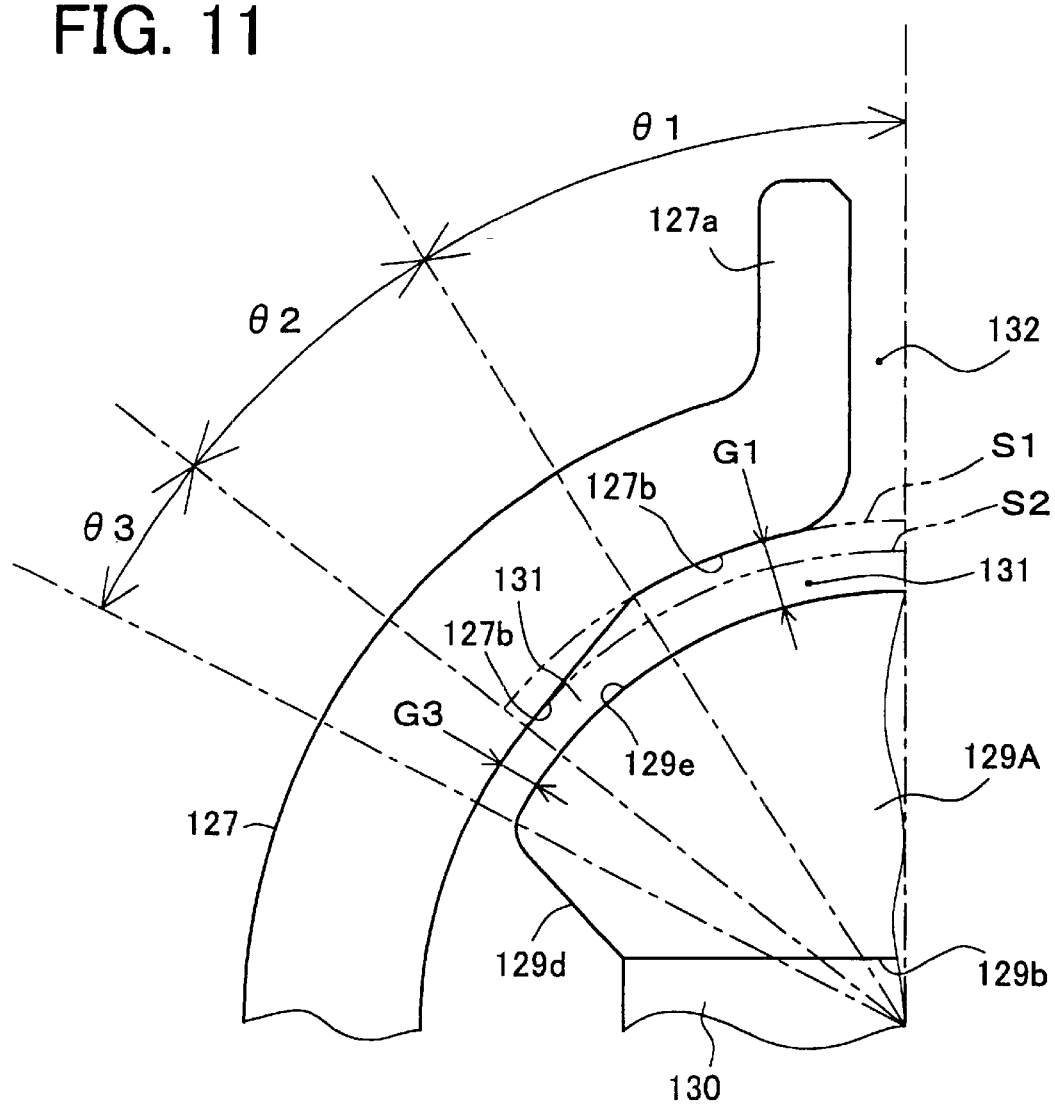
FIG. 11 is an enlarged view of a main part of the sensor core shown in FIG. 10.

The sensor core 114 in the second embodiment has a feature in the construction of the first air gap 131 and the inner core 129. The feature will be described below with reference to FIGS. 10 and 11. FIG. 10 is a plan view showing the constructive feature of the sensor core 114. FIG. 11 is an enlarged view showing a main part of the sensor core 114 in FIG. 10. As shown in FIG. 10, the outer core 127 and the rotor 128 are arranged in a state that a straight line L1 passing the two second air gaps 132 of the outer core 127 is orthogonal to a straight line L2 passing the lengthwise direction of the plate magnet 130 of the rotor 128.

In the inner core 129 arranged as above, a taper face 129d is provided at both ends of each of the core pieces 129A and 129B. The taper face 129d is inclined from each outer periphery of the core pieces 129a and 129B toward an end face of the plate magnet 130 held between the core pieces 129A and 129B. The taper face 129d makes a predetermined taper angle θt with the inner wall faces 129b and 129c of the core pieces 129A and 129B. In the second embodiment, the taper angle θt is 45°. Moreover, the taper angle θt may be properly determined within a range from 40° to 60°. In the second embodiment, a length of the taper face 129d is set to about 40% of a radius of the inner core 129.

The first air gap 131 is formed between the outer peripheral surface of the inner core 129 and the inner peripheral surface of the outer core 127. As shown in FIG. 11, in the second embodiment, the first air gap 131 is formed between each outer peripheral surface 129e of the core pieces 129A and 129B excluding the taper face 129d, and the inner peripheral surface 127b of the outer core 127. Roughly speaking, the first air gap 131 is designed so as to change in its dimension with approach toward the second air gap 132. In the second embodiment, the first air gap 131 is determined so that the dimension is relatively larger at a position near the second air gap 132 than other positions. Moreover, in the second embodiment, the inner peripheral surface of the outer core 127 is set to have a predetermined shape to thereby determine the shape of the first air gap 131. More specifically, the inner peripheral surface 127b of the outer core 127 is partially formed with a stepped portion so that the dimension of the first air gap 131 stepwise increases with approach toward the second air gap 132 and becomes the largest in the close vicinity of the gap 132.

In FIGS. 10 and 11, an effective range angle θ0 is defined, and the effective range angle θ0 is a range where the inner peripheral surface 127b of the outer core 127 faces each outer peripheral surface 129e of the core pieces 129A and 129B, using the straight line L1 as a reference. In the effective range angle θ0, a first range angle θ1, a second range angle θ2 and a third range angle θ3 are defined in succession from the range near the second air gap 132. In the second embodiment, in FIGS. 10 and 11, assuming that a first curvature of the first range angle θ1 near the second air gap 132 is set as S1, and a third curvature of the third range angle θ3 far from the second air gap 132 is set as S2, the shape of the inner peripheral surface of the outer core 127 is determined to become S1<S2 and form a taper in the second range angle θ2. In this case, the curvature means a value indicative of a degree of curve of a curved line or curved surface at each point on the curved line or surface. The higher the curvature is, the larger a curve becomes. As shown by a broken line in FIG. 8, the shape of the inner peripheral surface is set at four portions adjacent to four ribs 127a of the outer core 127.

In the second embodiment, as shown in FIGS. 10 and 11, in the first air gap 131, a dimension G3 in the third range angle θ3 is set to 0.5 mm, and a dimension G1 in the first range angle θ1 is set to 0.85 mm. The first range angle θ1 may be set to a range from 25° to 35°. An angle combining the first range angle θ1 and the second range angle θ2 may be set to a range from 40° to 50°.

Figures 14A, 14B, 14C:
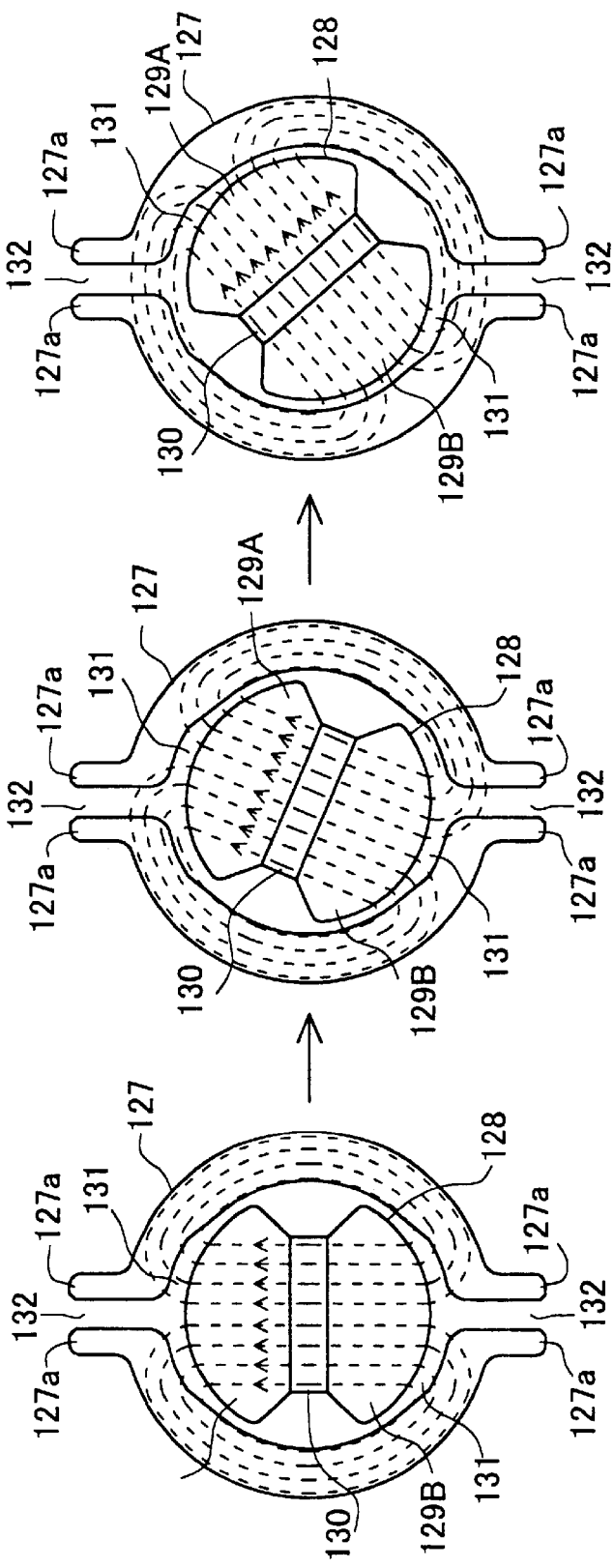
FIGS. 14A–14C are explanatory views showing movements of a magnetic field generated in the sensor core.

With the construction of the rotational angle sensor 111 constructed as above, a magnetic field is generated between the inner core 129 constituting the sensor core 114, the plate magnet 130 and the outer core 127, as shown by broken lines in FIG. 14A.

In this case, the rotor 128 is connected to the throttle valve shaft 116 of the throttle valve 113 which is an object of which a rotational angle is to be detected. Thus, the rotor 128 is rotated in the outer core 127 along with rotation of the throttle valve 113, thereby rotating the magnetic field successively as shown by broken lines in FIGS. 14A, 14B and 14C. A density of magnetic flux passing the two second air gaps 132 of the outer core 127 changes by rotation of the magnetic field. This change in magnetic flux density is detected by each of the Hall ICs 126 as a value correlated to a magnitude of a rotational angle of the throttle valve 113. The Hall IC 126 converts the change in magnetic flux density into a voltage change, and then, outputs it. The rotational angle sensor 111 in the second embodiment can thus detect the rotational angle of the throttle valve 113 in a predetermined detection range, and can provide linear output characteristics in the range.

The plate magnet 130 is magnetized in its thickness direction; there exists a little bias in a magnetic flux density of the rotating magnetic field according to positions in the magnet 130. In this second embodiment, on the other hand, the rotational angle sensor 111 including the sensor core 114 is configured to provide the shape of the inner peripheral surface of the outer core 127 so that the dimension of the first air gap 131 changes with approach toward the two second air gaps 132. In particular, the shape of the inner peripheral surface of the outer core 127 is designed so that the dimension of the first air gap 131 is relatively larger at the position near each of the second air gaps 132. More specifically, the inner peripheral surface of the outer core 127 is formed with a stepped portion to produce the first air gap 131 with a dimension stepwise becoming larger with approach toward each of the second air gaps 132. Therefore, even if the dimension of the first air gap 131 is made small as a whole, a bias of the magnetic flux density of the rotating magnetic field is stepwise canceled with approach toward the second air gap 132, adjusting a change in the density of the magnetic flux passing the second air gap 132. As a result, even if a small sized rotational angle sensor 111 is manufactured, the sensor can secure linearity in output characteristics of a sensor. Thus, the sensor core 114 and the rotational angle sensor 111 using the sensor core 114 can be reduced in size while securing linearity in output characteristics.

With the construction of the rotational angle sensor 111 in the second embodiment, the plate magnet 130 is magnetized in its thickness direction; for this reason, considering a magnetic flux distribution of a magnetic field generated between the inner core 129, the plate magnet 130.and the outer core 127, there is a tendency for a magnetic flux density to become high in the vicinity of both ends of the plate magnet 130 in particular. On the other hand, in the sensor core 114 of the rotational angle sensor 111, both ends of each of the core pieces 129A and 129B are formed with the taper faces 129d each inclined from the outer peripheral surface 129e of each of the core pieces 129A and 129B toward the end face of the plate magnet 130 held between the core pieces 129A and 129B. Therefore, an increase in magnetic flux density is suppressed in the vicinity of both ends of the plate magnet 130, and the magnetic flux distribution is equalized in the whole magnetic filed. It is thus possible to further improve linearity in output characteristics of the rotational angle sensor 111, and to contribute to reduction in size of the sensor core 114 and the rotational angle sensor 111.

Figure 15:
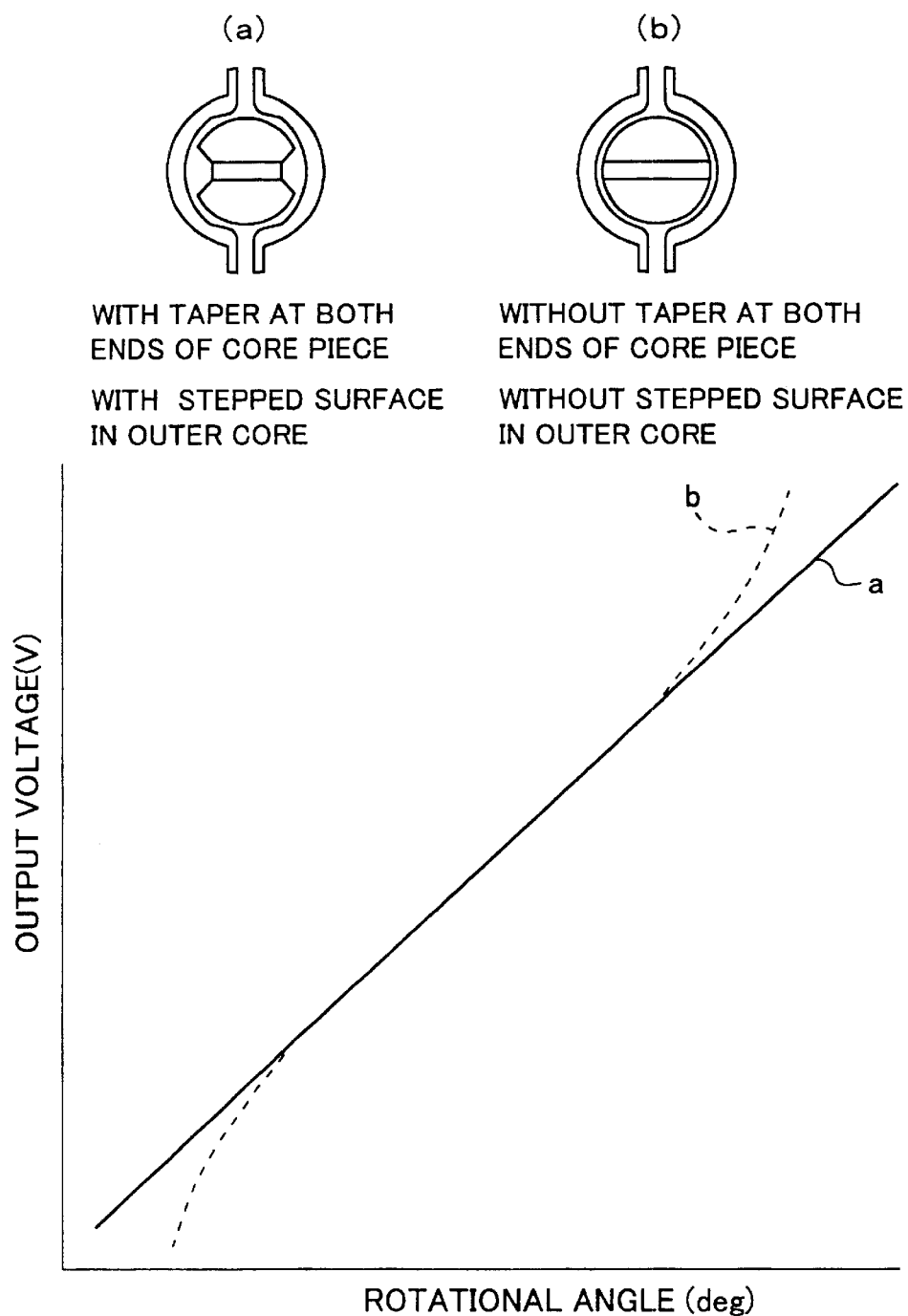
FIG. 15 is a graph showing output characteristics of the rotational angle sensor.

FIG. 15 is a graph showing output characteristics of the rotational angle sensor. In the graph of FIG. 15, the horizontal axis takes a rotational angle (deg), and the vertical line takes an output voltage (V) from the Hall IC 126. In the graph, a solid line shows an output result of the rotational angle sensor using the sensor core 114 (shown by (a)) of the second embodiment, in which the taper faces 129d are formed at both ends of each of the core pieces 129A and 129B of the inner core 129 and a stepped portion is formed on the inner peripheral surface 127b of the outer core 127. On the other hand, a broken line shows an output result of the rotational angle sensor using the sensor core (shown by (b)) of the prior art in which no taper face is formed at both ends of the core pieces of the inner core and no stepped portion is formed on the inner peripheral surface of the outer core.

As is evident from the graph, in the rotational angle sensor 111 using the sensor core 114 of the second embodiment, the output voltage linearly changes in all the range from a small rotational angle to a large rotational angle. In the rotational angle sensor using the sensor core of the prior art, on the other hand, the output voltage changes with a curved line in a smaller rotational angle and in a larger rotational angle respectively. From the above output result, it can be seen that the rotational angle sensor 111 using the sensor core 114 of the second embodiment can secure linearity in output characteristics needed as a sensor and detect a rotational angle (throttle opening) of the throttle valve 113 with high accuracy.

Figure 16:
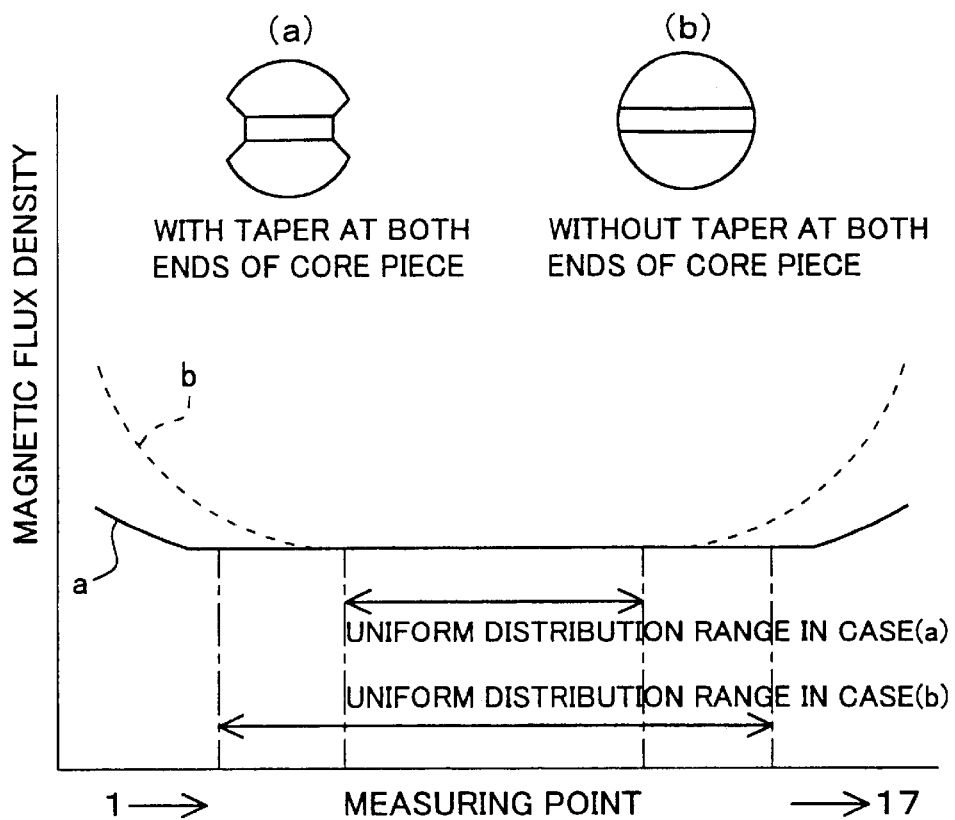
FIG. 16 is a graph showing density characteristics of magnetic flux generated in the sensor core.
Figure 17:
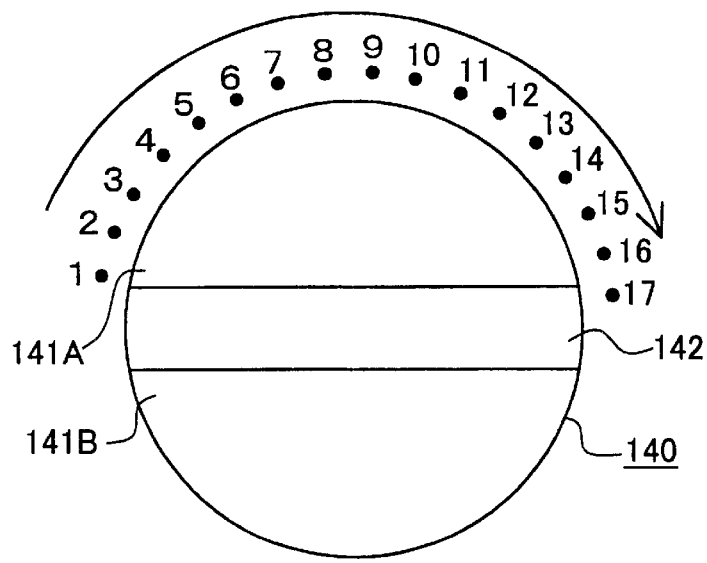
FIG. 17 is an explanatory view showing measuring points.

FIG. 16 is a graph showing density characteristics of magnetic flux generated in the sensor core 114. In the graph of FIG. 16, the horizontal axis takes measuring points successively set over the half of an outer periphery of a rotor 140, as shown in FIG. 17. The rotor 140 is constructed in a manner such that a plate magnet 142 is held between a pair of core pieces 141A and 141B. The vertical axis takes the density of magnetic flux at each measuring point. In the graph, a solid line shows a measuring result by the use of the sensor core 114 (shown by (a)) of the second embodiment including the rotor 128 having the taper faces 129d at both ends of the core pieces 129A and 129B of the inner core 129. On the other hand, a broken line shows a measuring result of the conventional sensor core (shown by (b)) having no taper face at both ends of the core pieces of the inner core.

As is evident from the graph of FIG. 16, a uniform distribution range of magnetic flux density is wider in the sensor core 114 of the second embodiment as compared with the sensor core of the prior art. Namely, the rotational angle sensor 111 using the sensor core 114 of the second embodiment can advantageously secure linearity in output characteristics needed as a sensor.

In the rotational angle sensor 111 of the second embodiment, two Hall ICs 126 in all are arranged at the second air gaps 132 on two positions which are in rotational symmetry in the outer core 127. Thus, even if one of the two Hall ICs 126 breaks down, the other Hall IC 126 can be used for detecting a magnetic flux density. The thus constructed rotational angle sensor 111 can provide a fail-safe function, so that the reliability of the rotational angle sensor 111 can be enhanced.

As described above, the second embodiment provides the non-contact type rotational angle sensor 111 having no sliding portion at the sensor core 114; therefore, unlike the conventional contact type rotational angle sensor, no erroneous detection is caused due to frictional particles generated in the sliding portion. Thus, the reliability needed as a sensor can be maintained for a long period. In addition, unlike the conventional contact type rotational angle sensor, a frictional resistance of the sliding portion does not become an operating resistance to the object to be detected. Accordingly, the rotational angle sensor 111 used as a throttle sensor will cause no reduction in an operating responsivity of the throttle valve 113 which is the object to be detected.

Third Embodiment

Next, a non-contact type rotational angle sensor and its sensor core in a third embodiment according to the present invention will be described below with reference to the accompanying drawings.

In the following embodiments, like reference numerals are used to designate the same constituent member as the second embodiment and the details are omitted. The following is mainly a description relative to features different from the second embodiment.

Figure 18:
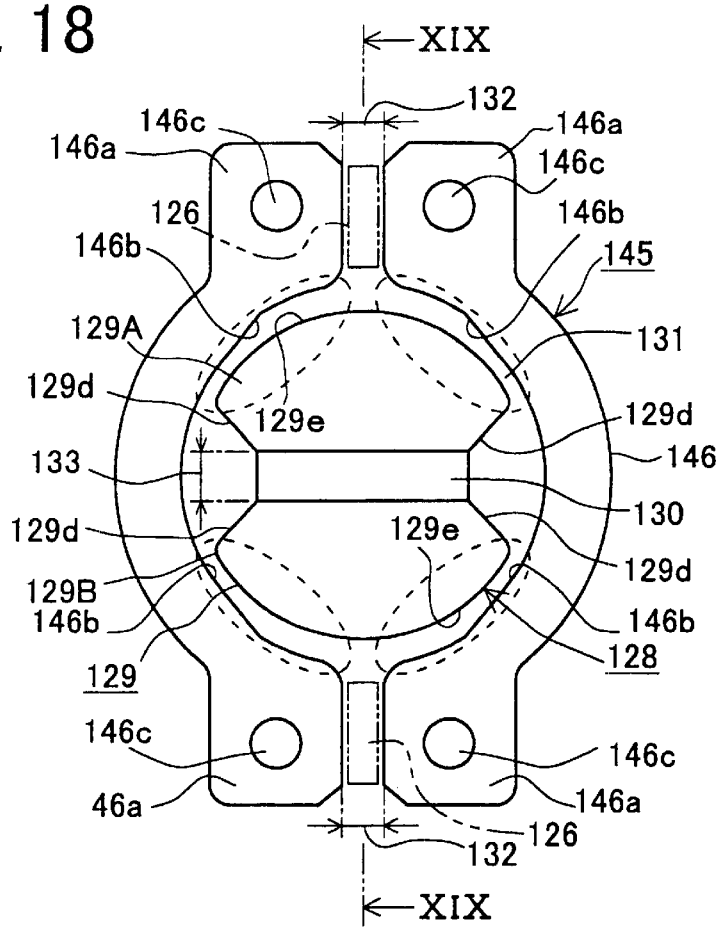
FIG. 18 is a plan view of a sensor core in a third embodiment.
Figure 19:
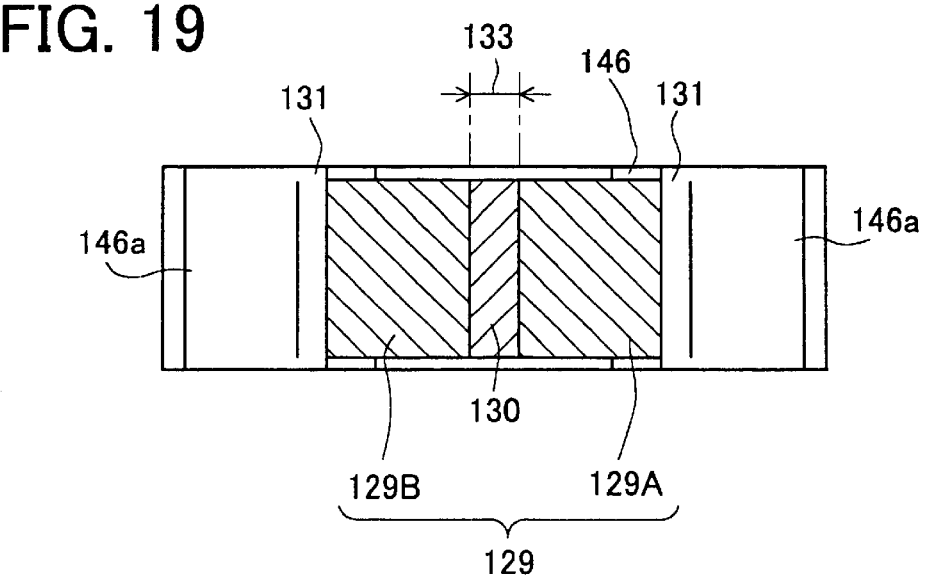
FIG. 19 is a sectional view taken along the line XIX—XIX in FIG. 18.
Figure 20:
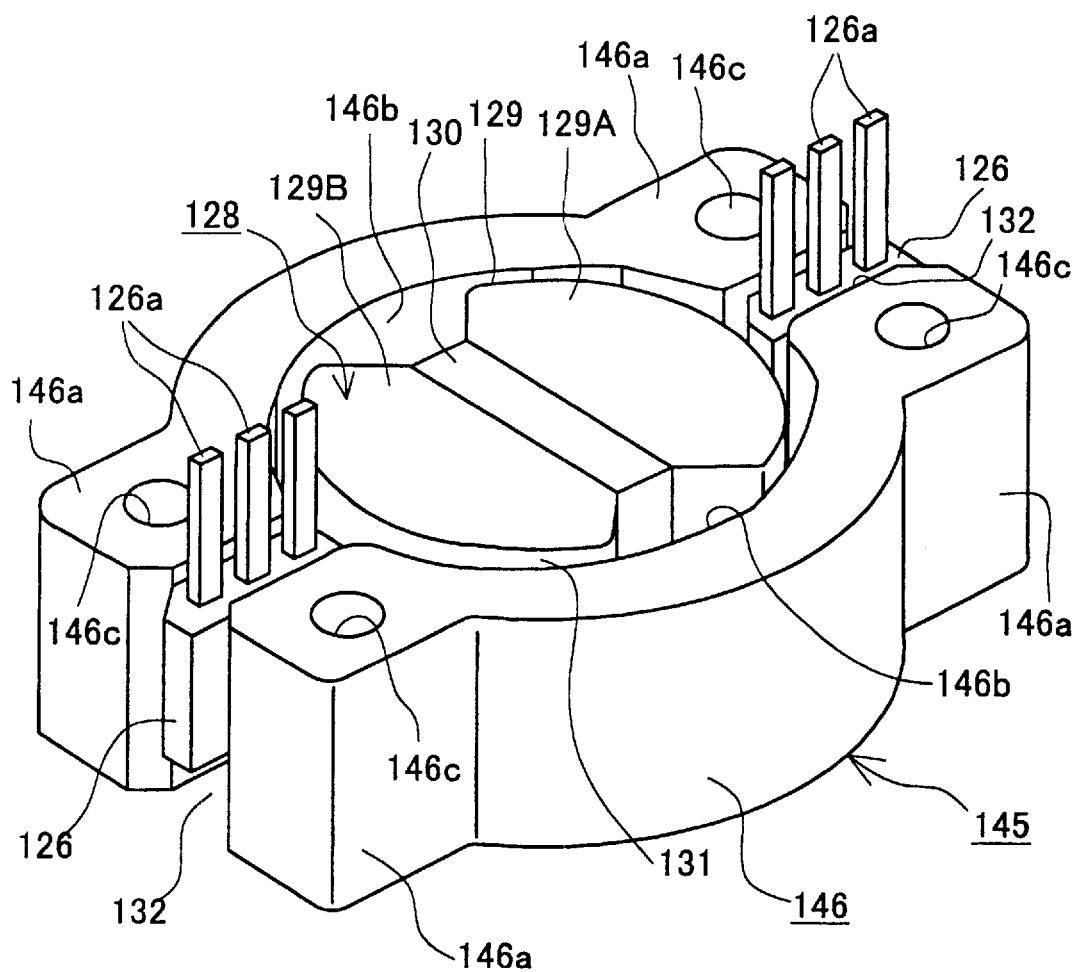
FIG. 20 is a perspective view of a bottom side of the sensor core of FIG. 18.

FIG. 18 is a plan view of a sensor core 145 used in the rotational angle sensor, and FIG. 19 is sectional view taken along the line XIX—XIX in FIG. 18. FIG. 20 is a perspective view of a bottom side of the sensor core 145. In the third embodiment, a rib 146a of an outer core 146 differs in shape from the sensor core 114 in the second embodiment. The rotor 128 and the constructive features surrounded by broken lines in FIG. 18 are the same as the sensor core 114.

As shown in FIGS. 18 to 20, in the third embodiment, each of the ribs 146a of the outer core 146 has a width wider than the rib 127a of the outer core 127 in the second embodiment. The rib 146a is formed with a positioning through hole 146c at the center thereof. The through hole 146c is used as a positioning hole for fixing the sensor core 145 on a substrate.

Therefore, the sensor core 145 in the third embodiment and the rotational angle sensor using the sensor core 145 can provide the same effect and operation as in the second embodiment. In addition, since the outer core 146 is formed with the plurality of positioning through holes 146c, the sensor core 145 can be attached to the substrate without distinction of shape of the substrate. Accordingly, a sensor core 145 having a high general purpose can be achieved.

Fourth Embodiment

Next, a non-contact type rotational angle sensor and its sensor core in a fourth embodiment according to the present invention will be described below with reference to the accompanying drawings.

Figure 21:
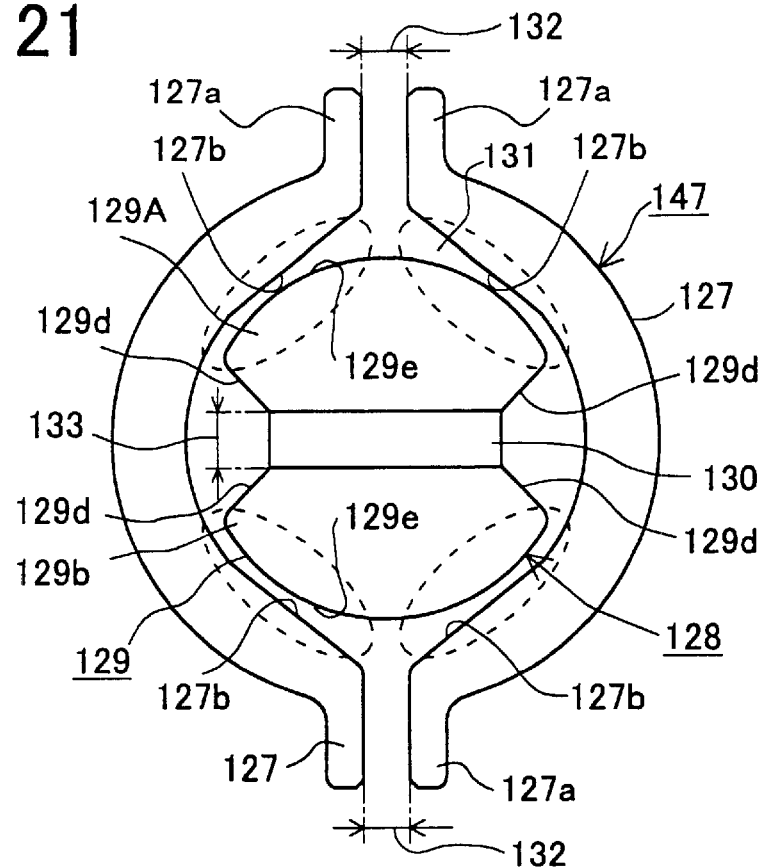
FIG. 21 is a plan view of a sensor core in a fourth embodiment.
Figure 22:
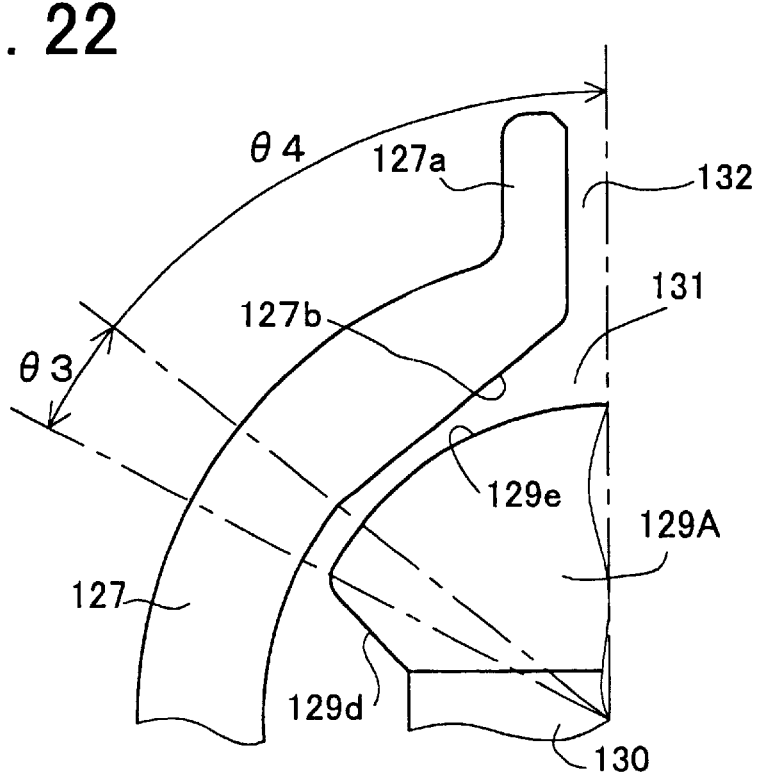
FIG. 22 is an enlarged view of a main part of the sensor core of FIG. 21.

FIG. 21 is a plan view of a sensor core 147 used in the rotational angle sensor, and FIG. 22 is an enlarged view of a portion surrounded by a broken line in FIG. 21. In the fourth embodiment, an inner peripheral surface 127b of the outer core 127 is different in shape from the sensor core 114 in the second embodiment. It is to be noted that the rotor 128 has the same structure as the sensor core 114 in the second embodiment.

In the fourth embodiment, as shown in FIGS. 21 and 22, the inner peripheral surface 127b of the outer core 127 is formed with a taper so that the dimension of the first air gap 131 increases continuously with approach toward the second air gap 132 and then becomes the largest in the close vicinity of the second air gap 132 in the effective range angle. More specifically, as shown in FIG. 22, in a fourth range angle θ4 combining the first and second range angles θ1 and θ2, the inner peripheral surface 127b has a taper so that the first air gap 131 is continuously widened toward the second gap 132.

As mentioned above, the sensor core 147 and the rotational angle sensor using the sensor core 147 is configured such that the inner peripheral surface 127b of the outer core 127 is formed with a taper to produce the first gap 131 increasing in dimension with approach toward the second air gap 132. It is therefore possible to continuously cancel a bias of the magnetic flux density of a magnetic field generated in the thus constructed sensor core 147, and to adjust a change in the magnetic flux density passing the second air gap 132. Accordingly, the fourth embodiment can provide the same effect as the above second embodiment.

Fifth Embodiment

Next, a non-contact type rotational angle sensor and its sensor core in a fifth embodiment according to the present invention will be described below with reference to the accompanying drawings.

Figure 23:
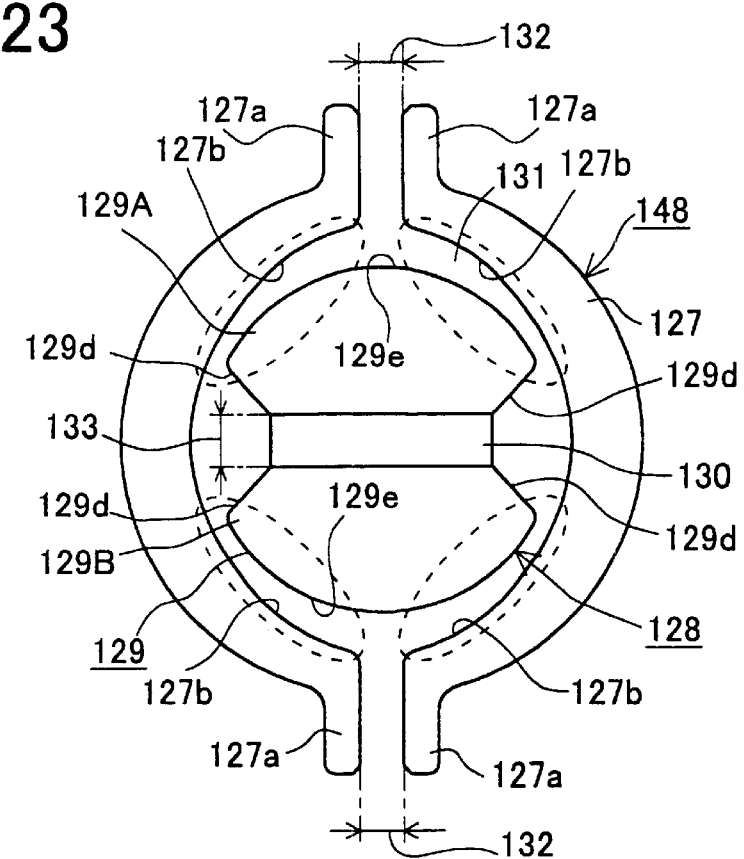
FIG. 23 is a plan view of a sensor core in a fifth embodiment.

FIG. 23 is a plan view of a sensor core 148 used in the rotational angle sensor, and FIG. 23 is an enlarged view of a portion surrounded by a broken line in FIG. 23. In this fifth embodiment, an inner peripheral surface 127b of the outer core 127 is different in shape from the sensor core 114 in the second embodiment.

Figure 24:
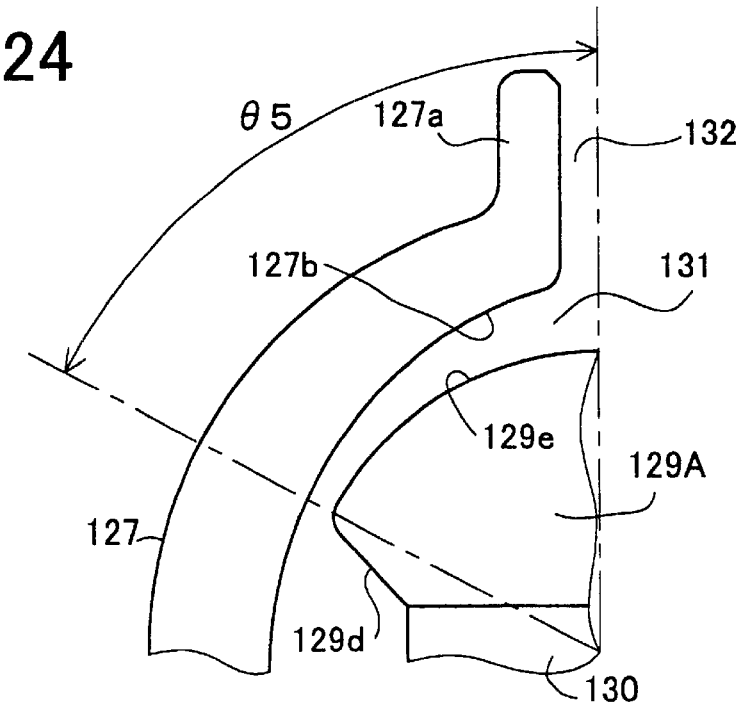
FIG. 24 is an enlarged view of a main part of the sensor core of FIG. 23.
Figure 25:
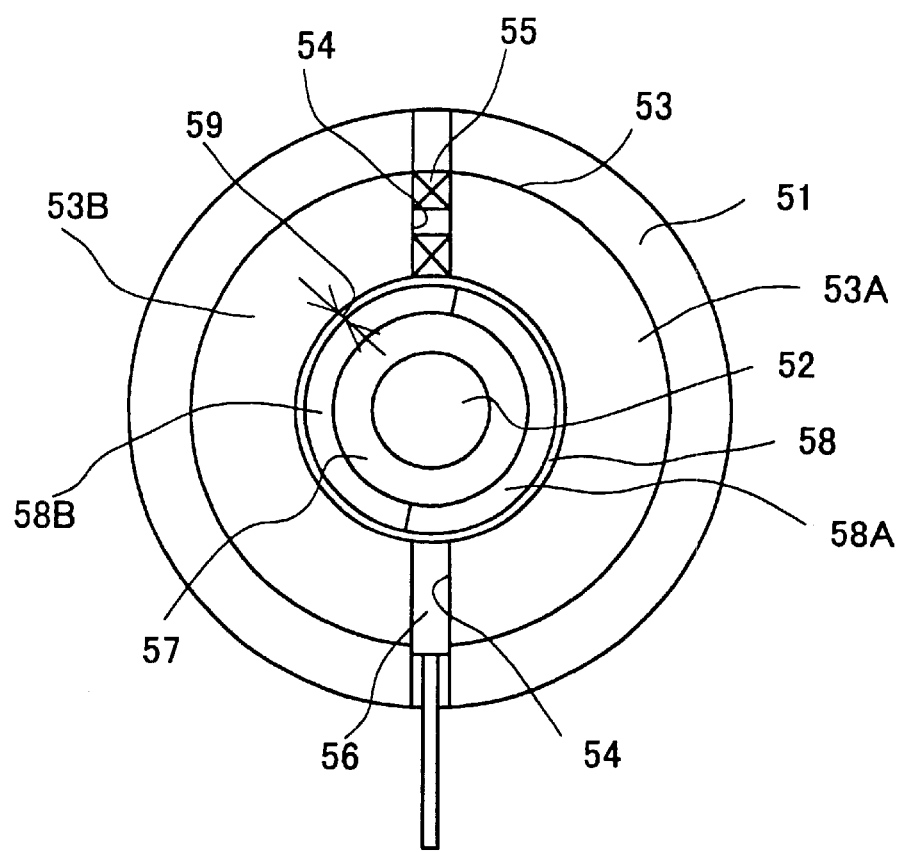
FIG. 25 is a plan view of a main part of a rotational angle sensor in a prior art.
Figure 26:
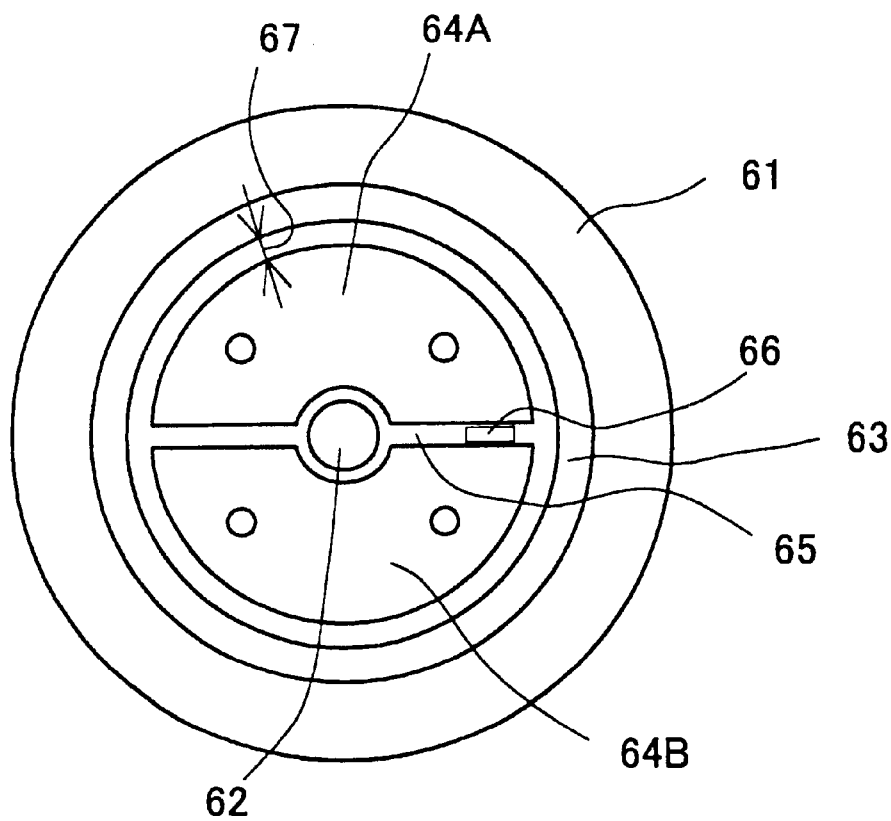
FIG. 26 is a plan view of a main part of another rotational angle sensor in the prior art.

In the fifth embodiment, as shown in FIGS. 23 and 24, the inner peripheral surface 127b of the outer core 127 is elliptic in a plan view so that the dimension of the first air gap 131 continuously increases with approach toward the second air gap 132 in the effective range angle. More specifically, as shown in FIG. 24, in a fifth angle range θ5 combining the first through third angle ranges θ1 through θ3, the whole inner peripheral surface 127b of the outer core 127 is shaped like an ellipse so that the first air gap 131 is continuously widened as approaching the second gap 132.

In the sensor core 148 and the rotational angle sensor using the sensor core 148, the inner peripheral surface 127b of the outer core 127 is shaped to produce the first gap 132 increasing in dimension with approach toward the second air gap 132. Thus, a bias of the magnetic flux density of a magnetic field generated in the sensor core 148 can be continuously canceled, adjusting a change in the magnetic flux density passing the second air gap 132. Accordingly, the fifth embodiment can provide the same effect as the above second embodiment.

The present invention may be embodied in other specific forms without departing from the essential characteristics thereof. For instance, the above second to fifth embodiments may be modified as follows:

1) The above embodiments provide sensor cores 114, 145, 147 and 148 including the rotor 128 provided with both the first constructive feature that the taper faces 129d are formed at both ends of the core pieces 129a and 129B of the inner core 129 and the second constructive feature that the inner peripheral surface 127b of the outer core 127 is formed with the distinctive shape. Alternatively, there may be provided a sensor core including the rotor having only one of the above first and second constructive features.

2) In the above embodiments, the sensor cores 114, 145, 147 and 148 are formed with two second air gaps 132, and each of these gaps 132 is provided with the Hall IC 126. An alternative design is to provide one or three or more second air gaps to the sensor core with a Hall IC arranged in each gap.

3) In the above embodiments, the Hall IC 126 is used as magnetic force detecting means. The present invention is not limited to this Hall IC, and detection elements other than the Hall IC may be used.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A sensor core used in a non-contract type rotational angle sensor for detecting a rotational angle of an object in non-contact therewith by converting the rotational angle to a change in magnetic force, the sensor core including:
    a stator core provided with two blocks made of a magnetic material;
    a mover core provided with two blocks made of a magnetic material, disposed coaxially with the stator core;
    a first gap produced between the stator core and the mover core;
    a second gap produced between the two stator blocks;
    a third gap produced between the two mover blocks; and
    a rectangular parallelepiped magnet disposed in the third gap and magnetized in a direction across the third gap to connect the mover blocks, wherein the stator core has a radial dimension changing to produce the first gap stepwise so as to become largest in a vicinity of a center line of the second gap and the mover core has a radial dimension correspondingly changing.

2. The sensor core according to claim 1, wherein one of the stator core and mover core is an outer core, and an inside diameter of the outer core is designed so that a first curvature in a vicinity of the center line of the second gap is smaller than a second curvature at an angle which is 40° or more away from the center line of the second gap.

3. A non-contact type rotational angle sensor for detecting a rotational angle of an object in non-contact therewith by converting the rotational angle to a change in magnetic force, the sensor including:
    a sensor core including:
        a stator core provided with two blocks made of a magnetic material;
        a mover core provided with two blocks made of a magnetic material, disposed coaxially with the stator core;
        a first gap produced between the stator core and the mover core;
        a second gap produced between the two stator blocks;
        a third gap produced between the two mover blocks; and
        a rectangular parallelepiped magnet disposed in the third gap and magnetized in a direction across the third gap to connect the mover blocks, wherein the stator core has a radial dimension changing to produce the first gap stepwise so as to become largest in a vicinity of a center line of the second gap and the mover core has a radial dimension changing, correspondingly;
    the sensor core further including a rotor constructed of the magnet mounted in the third gap of the mover blocks, the sensor further including:
        a base for fixing the stator core; and
        magnetic force detecting means disposed in the second gap, for detecting a change in magnetic force in response to rotation of the rotor, the rotor being connected with the object, and the first gap of the sensor core is designed so that a linear relation is provided between the rotational angle and an output of the magnetic force detecting means.

4. The non-contact type rotational angle sensor according to claim 3, wherein the radial dimension of the stator core and the radial dimension of the mover core are determined so that the dimension of the first gap changes stepwise.

5. The non-contact type rotational angle sensor according to claim 3, wherein the shape of one of the mover core and the stator core is determined to include a taper surface so that the dimension of the first gap changes continuously.

6. The non-contact type rotational angle sensor according to claim 3, wherein the shape of one of the mover core and the stator core is determined to include an elliptic surface so that the dimension of the first gap changes continuously.

* * * * *